US012755442B2

(12) United States Patent
Kim et al.

(10) Patent No.: US 12,755,442 B2
(45) Date of Patent: Oct. 6, 2026

(54) CROSS-COMPONENT PREDICTION FOR BANDWIDTH COMPRESSION

(71) Applicant: QUALCOMM Incorporated, San Diego, CA (US)

(72) Inventors: Hyung Joon Kim, San Diego, CA (US); Venkata Meher Satchit Anand Kotra, Munich (DE); Wei-Jung Chien, San Diego, CA (US); Cheng-Teh Hsieh, Del Mar, CA (US); Marta Karczewicz, San Diego, CA (US); Natan Jacobson, San Diego, CA (US); Mark Sternberg, Toronto (CA); Andrew Edmund Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 18/745,914

(22) Filed: Jun. 17, 2024

(65) Prior Publication Data

US 2025/0384591 A1 Dec. 18, 2025

(51) Int. Cl.
*G06V 10/00* (2022.01)
*G06T 9/00* (2006.01)

(52) U.S. Cl.
CPC .............. *G06T 9/004* (2013.01); *G06T 9/001* (2013.01)

(58) Field of Classification Search
CPC .. H04N 19/593; H04N 19/597; H04N 19/136; H04N 19/176; H04N 19/103;
(Continued)

(56) References Cited

U.S. PATENT DOCUMENTS 5,274,719 A * 12/1993 Taniguchi .............. H04N 1/417 358/1.9
7,706,443 B2 4/2010 Chandramouly et al.
(Continued)

FOREIGN PATENT DOCUMENTS

GB 2498982 A 8/2013

OTHER PUBLICATIONS

JP et al. (JP WO2009057329 A1, Encoding Device, Decoding Device and Methods Thereof) date published Mar. 10, 2011.*
(Continued)

*Primary Examiner* — Amir Alavi
(74) *Attorney, Agent, or Firm* — Procopio, Cory, Hargreaves & Savitch LLP

(57) ABSTRACT

Aspects presented herein relate to methods and devices for data processing including an apparatus. The apparatus may obtain an indication of source data associated with a plurality of source components including a first source component and a second source component. The apparatus may also code the first source component based on a first prediction algorithm and the second source component based on the first prediction algorithm and a second prediction algorithm. Further, the apparatus may determine a first rate of the first prediction algorithm and a second rate of the second prediction algorithm based on the coding of the first source component and the second source component. The apparatus may also select the first prediction algorithm or the second prediction algorithm for a portion of a coding unit based on the first rate of the first prediction algorithm and the second rate of the second prediction algorithm.

20 Claims, 13 Drawing Sheets

(58) Field of Classification Search
CPC ...... H04N 19/42; H04N 19/186; G06T 9/004; G06T 9/001
See application file for complete search history.

(56) References Cited

U.S. PATENT DOCUMENTS

| | | | | |
|---|---|---|---|---|
| 8,107,749 | B2 * | 1/2012 | Birinov | H04N 19/61 382/236 |
| 8,923,395 | B2 * | 12/2014 | Wang | H04N 19/176 375/240.11 |
| 9,998,742 | B2 | 6/2018 | Chen et al. | |
| 10,979,705 | B2 * | 4/2021 | Jacobson | H04N 19/159 |
| 11,197,005 | B2 * | 12/2021 | Ramasubramonian | H04N 19/186 |
| 11,290,736 | B1 * | 3/2022 | Wang | H04N 19/105 |
| 11,509,890 | B2 * | 11/2022 | Sarwer | H04N 19/593 |
| 11,909,956 | B2 | 2/2024 | Lin et al. | |
| 12,028,516 | B2 * | 7/2024 | Jang | H04N 19/11 |
| 12,143,598 | B2 * | 11/2024 | Lim | H04N 19/159 |
| 12,556,711 | B2 * | 2/2026 | Francois | H04N 19/132 |
| 12,574,507 | B2 * | 3/2026 | Wang | H04N 19/11 |
| 2023/0262223 | A1 | 8/2023 | Ghaznavi Youvalari et al. | |
| 2025/0384591 | A1 * | 12/2025 | Kim | G06T 9/004 |

OTHER PUBLICATIONS

Khairat A., et al., “Adaptive Cross-component Prediction for 4:4:4 High Efficiency Video Coding”, Research Gate, Article Jan. 2015, 6 Pages.
International Search Report and Written Opinion PCT/US2025/031002 ISA/EPO Oct. 6, 2025.
Kim W-S., et al., “Cross-Component Prediction in HEVC”, IEEE Transactions on Circuits and Systems for Video Technology, Jan. 1, 2015, pp. 1-11, XP055588107, USA , Sections III, IV.
Strutz T., et al., “Efficient Lossless Compression of Colour Image Data with Diverse Characteristics”, Ultra Modern Telecommunications and Control Systems and Workshops (ICUMT), 2011 3rd International Congress on IEEE, Oct. 5, 2011, pp. 1-5, XP032021378, Sections I, II and III.
Zhang L., et al., “Adaptive Color-Space Transform in HEVC Screen Content Coding”, IEEE Journal on Emerging and Selected Topics in Circuits and Systems, IEEE, Piscataway, NJ, USA, vol. 6, No. 4, Dec. 1, 2016, pp. 446-459, XP011636924, Abstract, Sections I, II.

* cited by examiner

400

CROSS-COMPONENT PREDICTION FOR BANDWIDTH COMPRESSION

TECHNICAL FIELD

The present disclosure relates generally to processing systems and, more particularly, to one or more techniques for data processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A graphics processor of a device may be configured to perform the processes in a graphics processing pipeline. Further, graphics processors may perform a number of different operations for bandwidth compression. However, there has developed a need for improved bandwidth compression operations.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform for graphics processing. The apparatus may obtain an indication of source data associated with a plurality of source components, where the plurality of source components includes at least one first source component and at least one second source component. The apparatus may also code the at least one first source component based on a first prediction algorithm and the at least one second source component based on the first prediction algorithm and a second prediction algorithm. The apparatus may also determine a bias associated with the at least one first source component and the at least one second source component. Additionally, the apparatus may perform a prediction process associated with the first rate of the first prediction algorithm and the second rate of the second prediction algorithm. The apparatus may also perform an entropy coding process for grouping a set of coding samples for a residual associated with the first prediction algorithm or the second prediction algorithm. Moreover, the apparatus may determine a first rate of the first prediction algorithm and a second rate of the second prediction algorithm based on the coding of the at least one first source component and the at least one second source component. The apparatus may also select the first prediction algorithm or the second prediction algorithm for a portion of a coding unit based on the first rate of the first prediction algorithm and the second rate of the second prediction algorithm. The apparatus may also signal an indication of a sample of the at least one second source component based on the selection of the first prediction algorithm; or signal an indication of a bias based on the selection of the second prediction algorithm. The apparatus may also generate a bitstream based on the selection of the first prediction algorithm or the second prediction algorithm for the portion of the coding unit. The apparatus may also output an indication of the selection of the first prediction algorithm or the second prediction algorithm for the portion of the coding unit.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
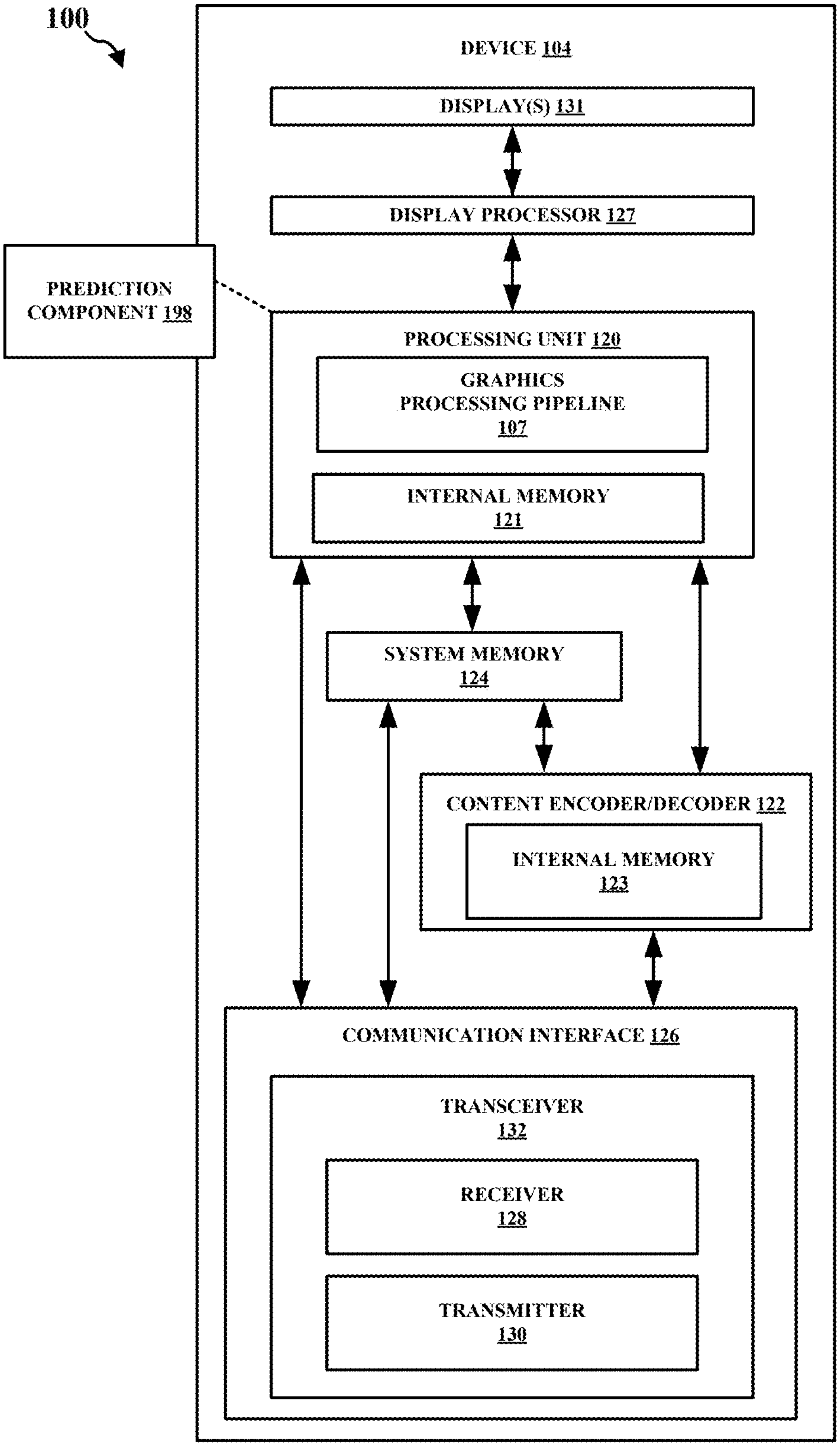
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended. As used herein, the term "source data" may refer to any type of data (e.g., graphics data) that is used in data processing, graphics processing, or color processing. As used herein, the term "source component" may refer to any type of component that is used in data processing, graphics processing, or color processing (e.g., a red (R), green (G), blue (B), alpha (A) (RGBA) component). As used herein, the term "prediction algorithm" may refer to any type of algorithm that is used in data processing, graphics processing, or color processing (e.g., a spatial prediction (SP) algorithm, a cross-component prediction (CCP) algorithm, a two-dimensional (2D) parallelogram prediction algorithm, a direct prediction algorithm). As used herein, the term "coding unit" may refer to any type of unit or component that encodes or decodes data (e.g., an encoder or a decoder at a graphics processor). As used herein, the term "prediction process" may refer to any type of process that is used in predicting data for data processing, graphics processing, or color processing (e.g., a spatial prediction (SP) process, a cross-component prediction (CCP) process, a two-dimensional (2D) parallelogram prediction process, a direct prediction process). As used herein, the term "bias" may refer to a statistical weight associated with data or a component utilized in data processing, graphics processing, or color processing. As used herein, the term "bit depth" may refer to a number of bits per pixel, sample, or texture pixel (texel) in an image (including one or more channels). The term bit depth may also refer to color depth which may be the number of bits used to indicate the color of a pixel or the number of bits used for each color component of a single pixel. As used herein, the term "bitstream" may refer to a sequence of bits. As used herein, the term "spatial prediction" may refer to a two-dimensional (2D) parallelogram prediction process. As used herein, the term "cross-component prediction" may refer to a prediction between source components included in at least one first source component and at least one second source component. As used herein, the term "entropy coding" or "entropy encoding" may refer to any lossless data compression method that attempts to approach a lower bound (e.g., a lower bound declared by Shannon's source coding theorem, which states that any lossless data compression method will have an expected code length greater than or equal to the entropy of the source). As used herein, the term "coding sample" may refer to any sample that is associated with a program or code. As used herein, the term "residual" may refer to a difference between observed values and predicted values of data in a statistical or machine learning model. As used herein, the term "codec" may refer to a device or computer program that encodes or decodes a data stream or signal (e.g., a codec may be a portmanteau of a coder/decoder). As used herein, the term "Bayer filter," "Bayer," or "Bayer pattern," may refer to a color filter array (CFA) for arranging color filters (e.g., RGB color filters) on a grid of photosensors for a camera module. For example, the filter pattern in a Bayer filter" may be half green, one quarter red, and one quarter blue, and thus may also be referred to as BGGR, RGBG, GRBG, or RGGB.

Modern system-on-chips (SoCs) cover many memory-intensive use cases. As such, memory bandwidth and space is valuable and at a premium at certain devices (e.g., a GPU or CPU). Memory bandwidth compression algorithms may help to mitigate this by compressing surfaces stored in memory (e.g., system memory or graphics memory (GMEM)). For instance, both lossless and lossy bandwidth compression algorithms may compress surfaces stored in memory. Such types of compression algorithms may be ubiquitous at a system level. A few examples of these types of compression algorithms are frame buffer compression, lossy bandwidth compression, lossless bandwidth compression, and UBWC, each of which allow the compression of data. That is, bandwidth compression algorithms may allow the compression of surfaces as they are written to, and read from, main memory. For instance, a real-time system including cores may need to communicate with each other through system memory, so there may be a power benefit by compressing surfaces as they get written into memory and then decompressing them when they come out of memory. These aforementioned compression algorithms may be used by many types of intellectual property cores (e.g., a GPU, a video decoder, a display, a camera, CPU, DSP, etc.). However, at times the performance of bandwidth compression may suffer at these types of devices. Based on the above, it may be beneficial to improve the performance of certain types of bandwidth compression. Aspects of the present disclosure may improve the performance of certain types of bandwidth compression or decompression.

Aspects of the present disclosure may include a number of benefits or advantages. For instance, aspects of the present disclosure may improve the performance of certain types of bandwidth compression or decompression. Aspects of the present disclosure may also improve the performance of certain types of bandwidth compression or decompression in lossless and lossy operating modes. That is, aspects presented herein may improve the performance of coding efficiency of a lossless bandwidth compression algorithms or lossy bandwidth compression algorithms. By doing so, aspects of the present disclosure may optimize the compression ratio of bandwidth compression algorithms. Aspects presented herein may also utilize methods for improving the coding efficiency of a lossless or lossy bandwidth compression algorithms. These improvements be due to leveraging the correlation between color components. These algorithmic improvements may be utilized in bandwidth compression codec for several RGBA surface formats in bandwidth compression (e.g., formats in UBWC). Aspects presented herein may also utilize extensions of cross-component prediction to certain formats (e.g., Bayer formats).

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term “non-transitory” may indicate that the storage medium is not embodied in a carrier wave or a propagated signal. However, the term “non-transitory” should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a prediction component 198 configured to obtain an indication of source data associated with a plurality of source components, where the plurality of source components includes at least one first source component and at least one second source component. The prediction component 198 may also be configured to code the at least one first source component based on a first prediction algorithm and the at least one second source component based on the first prediction algorithm and a second prediction algorithm. The prediction component 198 may also be configured to determine a bias associated with the at least one first source component and the at least one second source component. The prediction component 198 may also be configured to perform a prediction process associated with the first rate of the first prediction algorithm and the second rate of the second prediction algorithm. The prediction component 198 may also be configured to perform an entropy coding process for grouping a set of coding samples for a residual associated with the first prediction algorithm or the second prediction algorithm. The prediction component 198 may also be configured to determine a first rate of the first prediction algorithm and a second rate of the second prediction algorithm based on the coding of the at least one first source component and the at least one second source component. The prediction component 198 may also be configured to select the first prediction algorithm or the second prediction algorithm for a portion of a coding unit based on the first rate of the first prediction algorithm and the second rate of the second prediction algorithm. The prediction component 198 may also be configured to signal an indication of a sample of the at least one second source component based on the selection of the first prediction algorithm; or signal an indication of a bias based on the selection of the second prediction algorithm. The prediction component 198 may also be configured to generate a bitstream based on the selection of the first prediction algorithm or the second prediction algorithm for the portion of the coding unit. The prediction component 198 may also be configured to output an indication of the selection of the first prediction algorithm or the second prediction algorithm for the portion of the coding unit. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
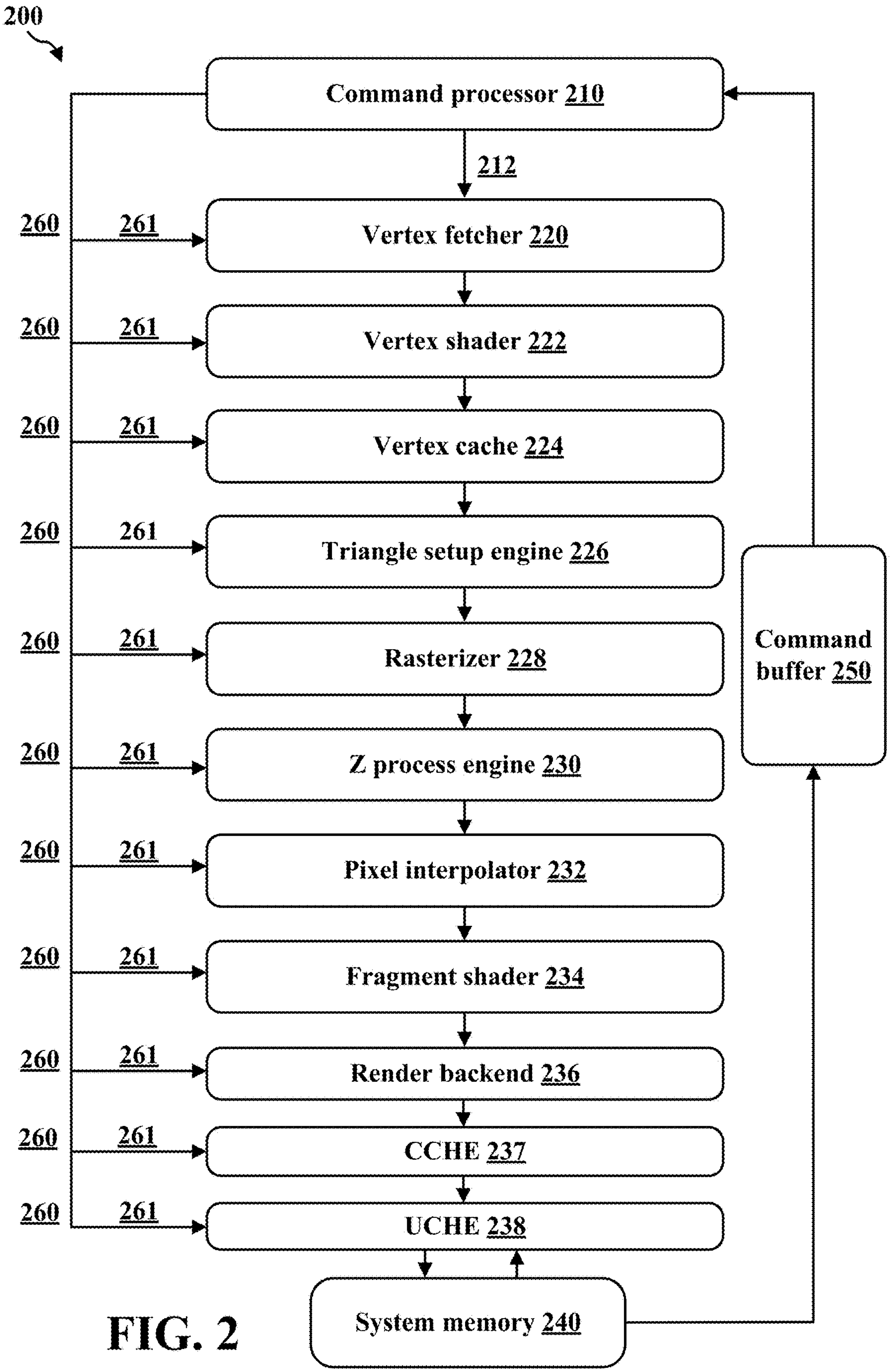
FIG. 2 illustrates an example graphics processing unit (GPU) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section (e.g., tile) of the image may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some types of GPUs may include different types of pipelines, such as a graphics processing pipeline. Graphics processing pipelines may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units at a GPU. Shader units may be configured as a programmable pipeline of processing components. In some examples, a shader unit may be referred to as "shader processors" or "unified shaders," and may perform geometry, vertex, pixel, or other shading operations to render graphics. Shader units may include shader processors, each of which may include one or more components for fetching and decoding operations, one or more arithmetic logic units (ALUs) for carrying out arithmetic calculations, one or more memories, caches, and registers.

Figure 3:
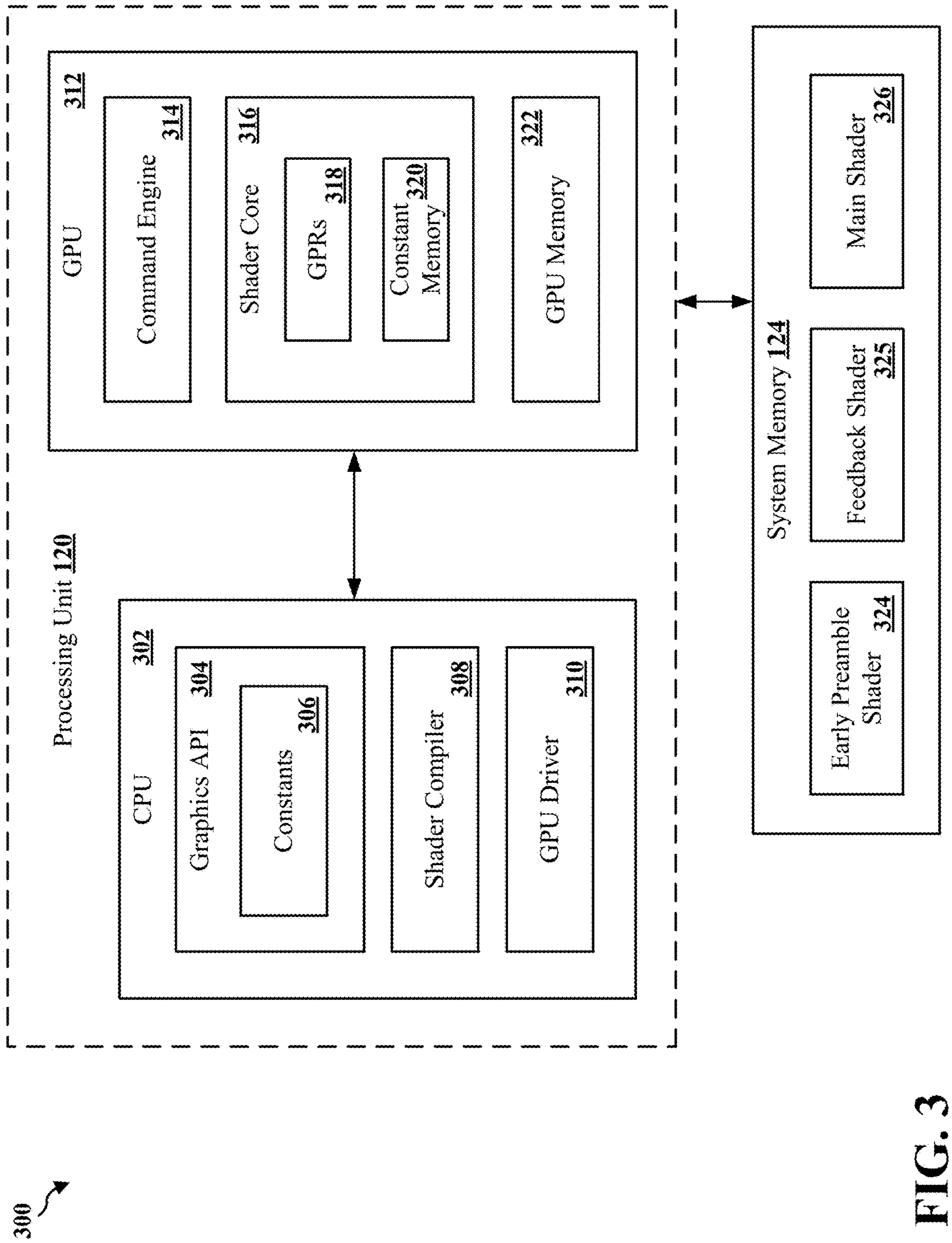
FIG. 3 is a diagram illustrating example processing components in accordance with one or more techniques of this disclosure.

FIG. 3 is a diagram 300 that illustrates processing components, such as the processing unit 120 and the system memory 124, as may be identified in connection with the device 104 for processing data. In aspects, the processing unit 120 may include a CPU 302 and a GPU 312. The GPU 312 and the CPU 302 may be formed as an integrated circuit (e.g., a system-on-a-chip (SOC)) and/or the GPU 312 may be incorporated onto a motherboard with the CPU 302. Alternatively, the CPU 302 and the GPU 312 may be configured as distinct processing units that are communicatively coupled to each other. For example, the GPU 312 may be incorporated on a graphics card that is installed in a port of the motherboard that includes the CPU 302.

The CPU 302 may be configured to execute a software application that causes graphical content to be displayed (e.g., on the display(s) 131 of the device 104) based on one or more operations of the GPU 312. The software application may issue instructions to a graphics application program interface (API) 304, which may be a runtime program that translates instructions received from the software application into a format that is readable by a GPU driver 310. After receiving instructions from the software application via the graphics API 304, the GPU driver 310 may control an operation of the GPU 312 based on the instructions. For example, the GPU driver 310 may generate one or more command streams that are placed into the system memory 124, where the GPU 312 is instructed to execute the command streams (e.g., via one or more system calls). A command engine 314 included in the GPU 312 is configured to retrieve the one or more commands stored in the command streams. The command engine 314 may provide commands from the command stream for execution by the GPU 312. The command engine 314 may be hardware of the GPU 312, software/firmware executing on the GPU 312, or a combination thereof. While the GPU driver 310 is configured to implement the graphics API 304, the GPU driver 310 is not limited to being configured in accordance with any particular API. The system memory 124 may store the code for the GPU driver 310, which the CPU 302 may retrieve for execution. In examples, the GPU driver 310 may be configured to allow communication between the CPU 302 and the GPU 312, such as when the CPU 302 offloads graphics or non-graphics processing tasks to the GPU 312 via the GPU driver 310.

The system memory 124 may further store source code for one or more of an early preamble shader 324, a feedback shader 325, or a main shader 326. In such configurations, a shader compiler 308 executing on the CPU 302 may compile the source code of the shaders 324-326 to create object code or intermediate code executable by a shader core 316 of the GPU 312 during runtime (e.g., at the time when the shaders 324-326 are to be executed on the shader core 316). In some examples, the shader compiler 308 may pre-compile the shaders 324-326 and store the object code or intermediate code of the shader programs in the system memory 124. The shader compiler 308 (or in another example the GPU driver 310) executing on the CPU 302 may build a shader program with multiple components including the early preamble shader 324, the feedback shader 325, and the main shader 326. The main shader 326 may correspond to a portion or the entirety of the shader program that does not include the early preamble shader 324 or the feedback shader 325. The shader compiler 308 may receive instructions to compile the shader(s) 324-326 from a program executing on the CPU 302. The shader compiler 308 may also identify constant load instructions and common operations in the shader program for including the common operations within the early preamble shader 324 (rather than the main shader 326). The shader compiler 308 may identify such common instructions, for example, based on (presently undetermined) constants 306 to be included in the common instructions. The constants 306 may be defined within the graphics API 304 to be constant across an entire draw call. The shader compiler 308 may utilize instructions such as a preamble shader start to indicate a beginning of the early preamble shader 324 and a preamble shader end to indicate an end of the early preamble shader 324. Similar instructions may be used for the feedback shader 325 and the main shader 326. The feedback shader 325 will be described in further detail below.

The shader core 316 included in the GPU 312 may include general purpose registers (GPRs) 318 and constant memory 320. The GPRs 318 may correspond to a single GPR, a GPR file, and/or a GPR bank. Each GPR in the GPRs 318 may store data accessible to a single thread. The software and/or firmware executing on GPU 312 may be a shader program 324-326, which may execute on the shader core 316 of GPU 312. The shader core 316 may be configured to execute many instances of the same instructions of the same shader program in parallel. For example, the shader core 316 may execute the main shader 326 for each pixel that defines a given shape. The shader core 316 may transmit and receive data from applications executing on the CPU 302. In examples, constants 306 used for execution of the shaders 324-326 may be stored in a constant memory 320 (e.g., a read/write constant RAM) or the GPRs 318. The shader core 316 may load the constants 306 into the constant memory 320. In further examples, execution of the early preamble shader 324 or the feedback shader 325 may cause a constant value or a set of constant values to be stored in on-chip memory such as the constant memory 320 (e.g., constant RAM), the GPU memory 322, or the system memory 124. The constant memory 320 may include memory accessible by all aspects of the shader core 316 rather than just a particular portion reserved for a particular thread such as values held in the GPRs 318.

In some aspects, different types of GPU hardware may support different types of workload execution. For instance, GPU hardware may support concurrent execution of different workloads. Concurrent execution may refer to the simultaneous execution of workloads at a GPU. Also, concurrent execution may refer to the execution of workloads in parallel at a GPU. GPU hardware may also support concurrent execution of different workloads in a time-shared manner. In some instances, concurrent execution of different workloads in a time-shared manner may improve the performance per area at the GPU. However, in other instances, concurrent execution of different workloads in a time-shared manner may reduce the performance per area at the GPU. Additionally, different types of workloads may take a different amount of processing time in various stages of the GPU pipeline. Also, these types of workloads may introduce inefficiency in GPU hardware utilization.

In some aspects, scheduling algorithms in order to time-share the GPU hardware may sequence the workload to achieve the best utilization of GPU hardware. However, some types of workloads may block the execution of other successive workloads. For instance, some workloads with a higher specification for a resource (e.g., memory access latency) may block the execution of other successive workloads, which may have reduced resource specification and a faster execution time (e.g., head of line blocking). In turn, this may reduce the overall hardware efficiency at the GPU. This kind of workload pattern is common in certain types of binning (e.g., concurrent binning). For example, in concurrent binning, a tile sorting pass for a certain frame (e.g., frame 'N+1') may be run concurrently with a rendering pass of another frame (e.g., frame 'N').

Figure 4:
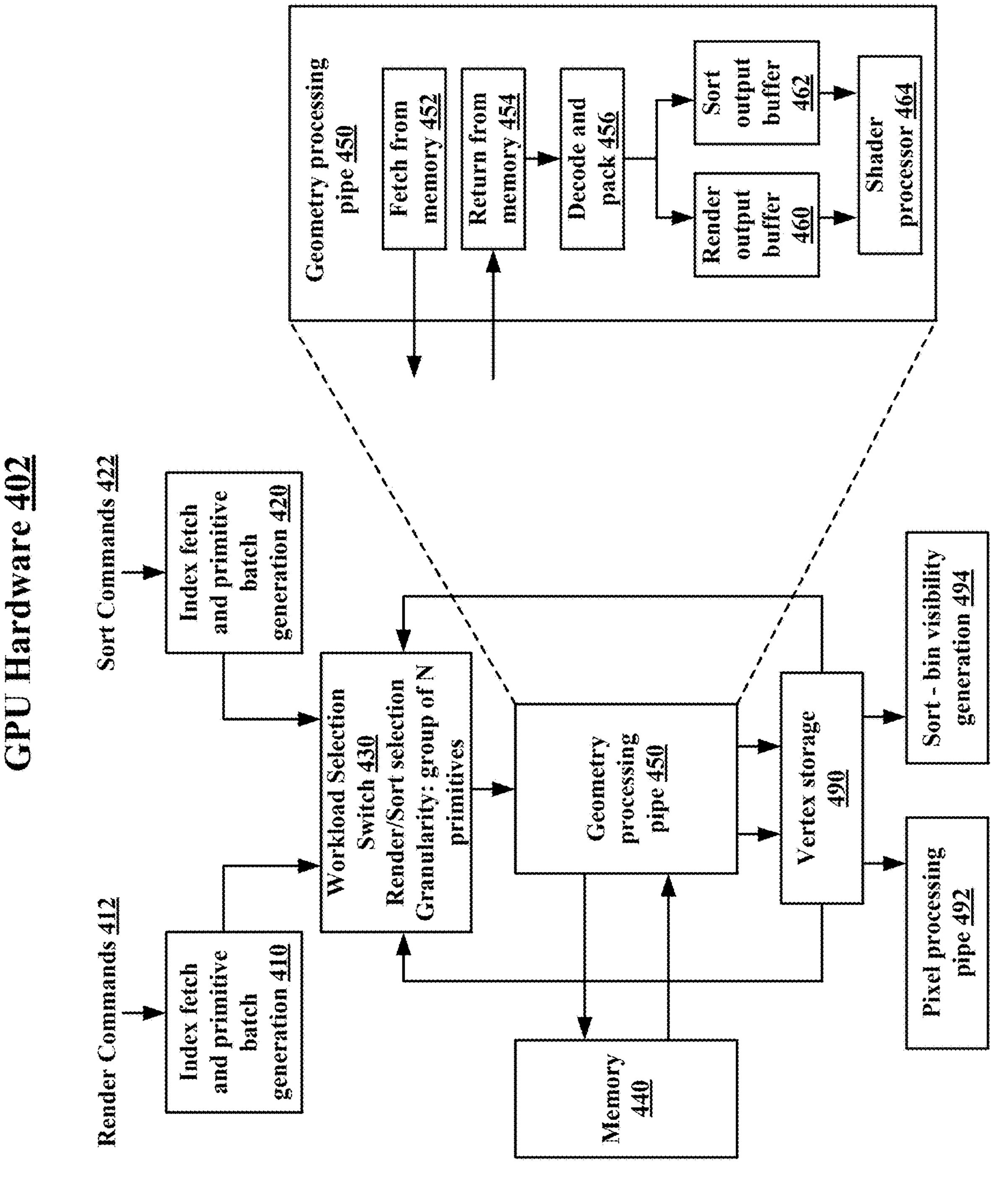
FIG. 4 is a diagram illustrating an example GPU hardware in accordance with one or more techniques of this disclosure.

FIG. 4 illustrates diagram 400 including one example of GPU hardware. More specifically, diagram 400 depicts a time-shared GPU hardware for concurrent binning. As shown in FIG. 4, diagram 400 includes GPU hardware 402 including index fetch and primitive batch generation component 410, index fetch and primitive batch generation component 420, software 430, memory 440, geometry processing pipe 450, vertex storage component 490, pixel processing pipe 492, and sort-bin visibility generation component 494. As shown in FIG. 4, render commands 412 may be input to index fetch and primitive batch generation component 410, which may be output to software 430. Similarly, sort commands 422 may be input to index fetch and primitive batch generation component 420, which may be output to software 430. The software 430 may have a render/sort selection capability, as well as a certain granularity (e.g., a granularity for a group of N primitives). The output of software 430 may be sent to geometry processing pipe 450, which may communicate with memory 440. The geometry processing pipe 450 may include fetch from memory component 452, return from memory component 454, decode and pack component 456, render output buffer 460, sort output buffer 462, and shader processor 464. Also, the output of geometry processing pipe 450 may be sent to vertex storage component 490, which may be sent to pixel processing pipe 492 and sort-bin visibility generation component 494.

As shown in FIG. 4, geometry pipe hardware (e.g., geometry processing pipe 450) may be time shared between tile sorting and tile render workloads. Also, a scheduling algorithm (e.g., software 430) may consider the availability of GPU hardware for tile sorting and tile render workload. The granularity of a workload may be selected such that there is limited workload switching overhead. Further, the granularity of a workload may be selected such that, at the same time, one workload does not block the other. As shown in FIG. 4, the software 430 may have a granularity of a group of N primitives. For instance, for concurrent binning, the workload distribution granularity may be a primitive batch (e.g., a set of N primitives).

Figure 5:
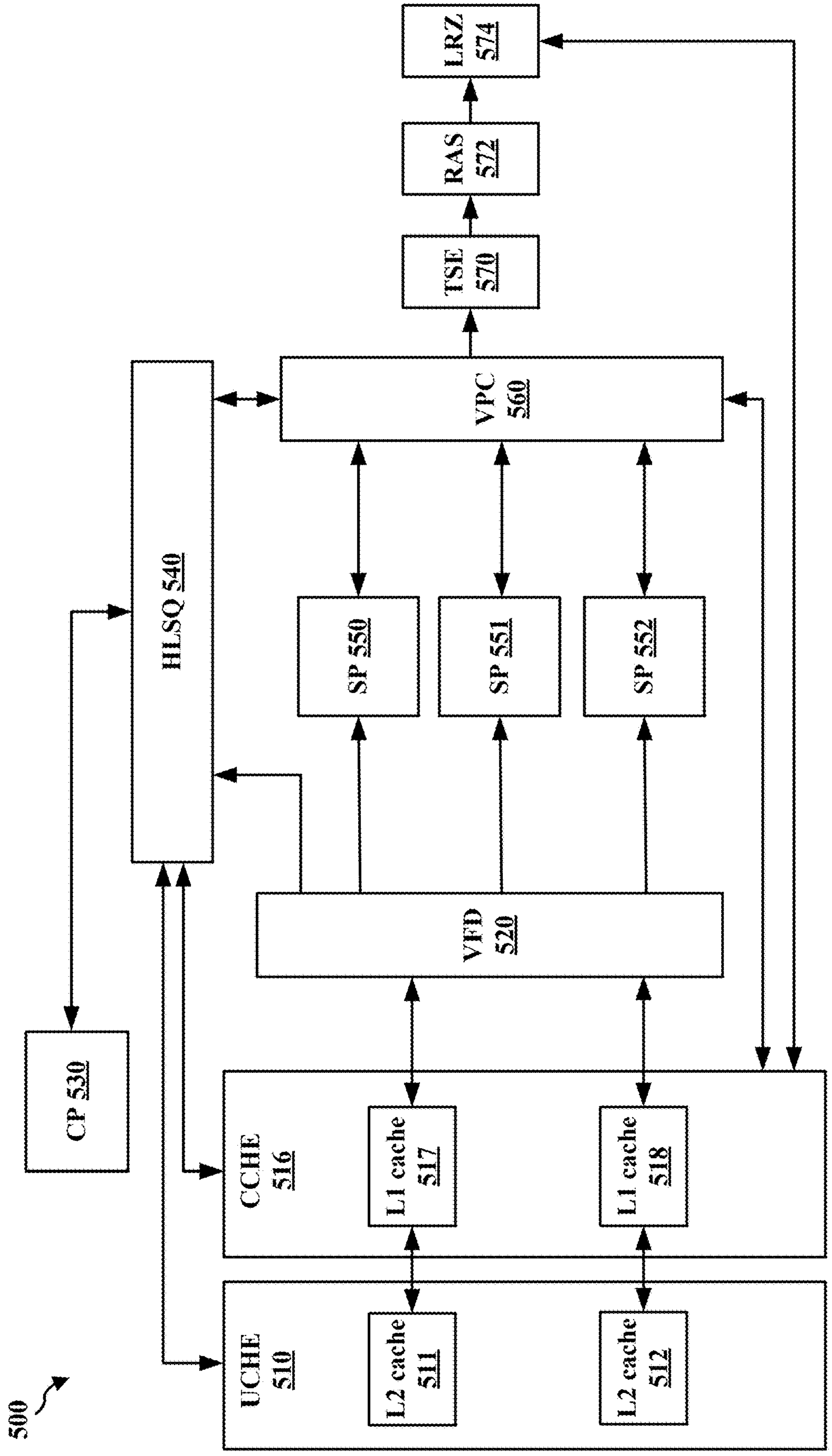
FIG. 5 is a diagram illustrating an example GPU in accordance with one or more techniques of this disclosure.

FIG. 5 is a diagram illustrating another example GPU. More specifically, FIG. 5 depicts GPU 500 including a number of different components. As shown in FIG. 5, GPU 500 includes UCHE 510 including L2 cache 511 and L2 cache 512, CCHE 516 including L1 cache 517 and L1 cache 518, VFD 520, CP 530, high level sequencer (HLSQ) 540, a number of SPs (e.g., SP 550, SP 551, and SP 552), VPC 560, TSE 570, RAS 572, and low resolution Z (LRZ) component (e.g., LRZ 574). As shown in FIG. 5, CP 530 may transmit data to HLSQ 540 and receive data from HLSQ 540. CCHE 516 may transmit/receive data to/from HLSQ 540. UCHE 510 may also transmit/receive data to/from HLSQ 540. L2 cache 511 and L2 cache 512 may transmit/receive data to/from VFD 520. Further, VFD 520 may transmit data to HLSQ 540, as well as transmit data to SPs 550-552. Moreover, SPs 550-552 may transmit/receive data to/from VPC 560. Also, VPC 560 may transmit/receive data to/from HLSQ 540. Data can also be transmitted from VPC 560 to TSE 570, which can transmit data to RAS 572, and then to LRZ 574. CCHE 516 can transmit/receive data to/from VPC 560 and LRZ 574. Also, UCHE 510 can transmit/receive data to/from VPC 560 and LRZ 574.

Some aspects of graphics processing may utilize certain GPU architectures and/or application structures. For instance, aspects of graphics processing may utilize a general purpose GPU (GPGPU) architecture that includes symmetric multiprocessor (SMs), shared cores, an interconnect unit, a dynamic random access memory (DRAM), and/or a number of different caches (e.g., a first level (L1) cache, a second level (L2) cache, and/or a last level cache (LLC)). In some instances of GPU architectures, a number of SMs, shared cores, and L1 caches may be connected to an interconnect unit. The interconnect unit may be connected to L2 caches and DRAMs. Additionally, in an application structure, an application may include a number of kernels, and each of the kernels (i.e., a programming operations manager or a programming thread at a GPU) may include concurrent thread arrays (CTAs), where each CTA includes a number of warps.

Data compression is the process of encoding information using fewer bits than the original representation. For instance, the process of reducing the size of data may be referred to as data compression. Data compression may be useful because it reduces the resources utilized to store and transmit data. Different types of data compression may be a lossy compression or a lossless compression. Lossless compression may result in no information being lost during the compression process (e.g., reduce the amount of bits by reducing statistical redundancy). Lossless compression is a type of data compression that corresponds to an accurate reconstruction of compressed data (i.e., data that is reconstructed without any data loss). Lossless compression techniques may also include a number of different data compression algorithms that may allow the data to be reconstructed without any data loss. Lossy compression may result in some information being lost mathematically during the compression process. In some aspects, a device that performs data compression may be referred as an encoder, and a device that performs the reverse process (decompression) may be referred as a decoder. Lossy bandwidth compression/decompression may be utilized by many different components of a device, such as a display, a graphics processor (e.g., a GPU), a video decoder, a camera, and a CPU. Lossy bandwidth compression/decompression may be useful for system-on-chips (SOCs), as SOCs may be configured to perform memory-intensive tasks in which memory bandwidth may be limited. Lossy bandwidth compression/decompression may help to conserve memory bandwidth by compressing surfaces stored in system memory. In some aspects, encoding may be performed at the source of data before it is stored or transmitted, while decoding may be performed after the storage or transmission of the data.

Bandwidth may refer to the maximum rate of data that can be transferred over a given time period and/or across a given path. Bandwidth may be referred to as network bandwidth, data bandwidth, or digital bandwidth. Further, bandwidth may also refer to the multimedia bit rate or average bitrate after multimedia data compression (e.g., source coding), which may be the total amount of data divided by the playback time. Bandwidth compression may refer to the reduction of the bandwidth needed to transmit a given amount of data in a given time. Bandwidth compression may refer to the reduction of the time needed to transmit a given amount of data in a given bandwidth. In some instances, bandwidth compression may imply a reduction in normal bandwidth of data or information without reducing the data or information content. Additionally, bandwidth compression may result in a reduced data amount that may be transferred over a time period.

Some aspects of bandwidth compression may utilize compression techniques (e.g., universal bandwidth compression (UBWC)) to reduce the amount of memory needed to store data. Further, some types of bandwidth compression (e.g., UBWC) may compress a certain type of data (e.g., display data or pixel data) which may help to reduce the total amount of data (e.g., bytes of data). In some aspects, in order to reduce the bandwidth utilized by certain data (e.g., display data), a lossless or lossy format may be utilized to compress the data (e.g., display data). Some types of compression formats (e.g., UBWC) may compress display data by spatially dividing the data into certain types of data (e.g., tiles or subtiles).

There are a number of different types of compression techniques that can be utilized in a number of different processing formats, such as data processing, graphics processing, video processing, camera processing, etc. For example, universal bandwidth compression (e.g., UBWC) or universal bandwidth decompression techniques may be utilized in data processing or graphics processing. Further, different data formats may be associated with compression techniques (e.g., UBWC) that are utilized in data processing or graphics processing. In some aspects, data for a particular data format may be utilized as a format for texture files and/or rendering, e.g., texture files and/or rendering during graphics processing at a graphics processor (e.g., a GPU). The data for a particular data format may allow certain graphics processor components (e.g., double data rate (DDR) memory) to reduce the amount of data fetched or retrieved at the graphics processor (e.g., a GPU). Additionally, the data for a particular data format may correspond to a reduced amount of memory bandwidth utilized.

Figure 6:
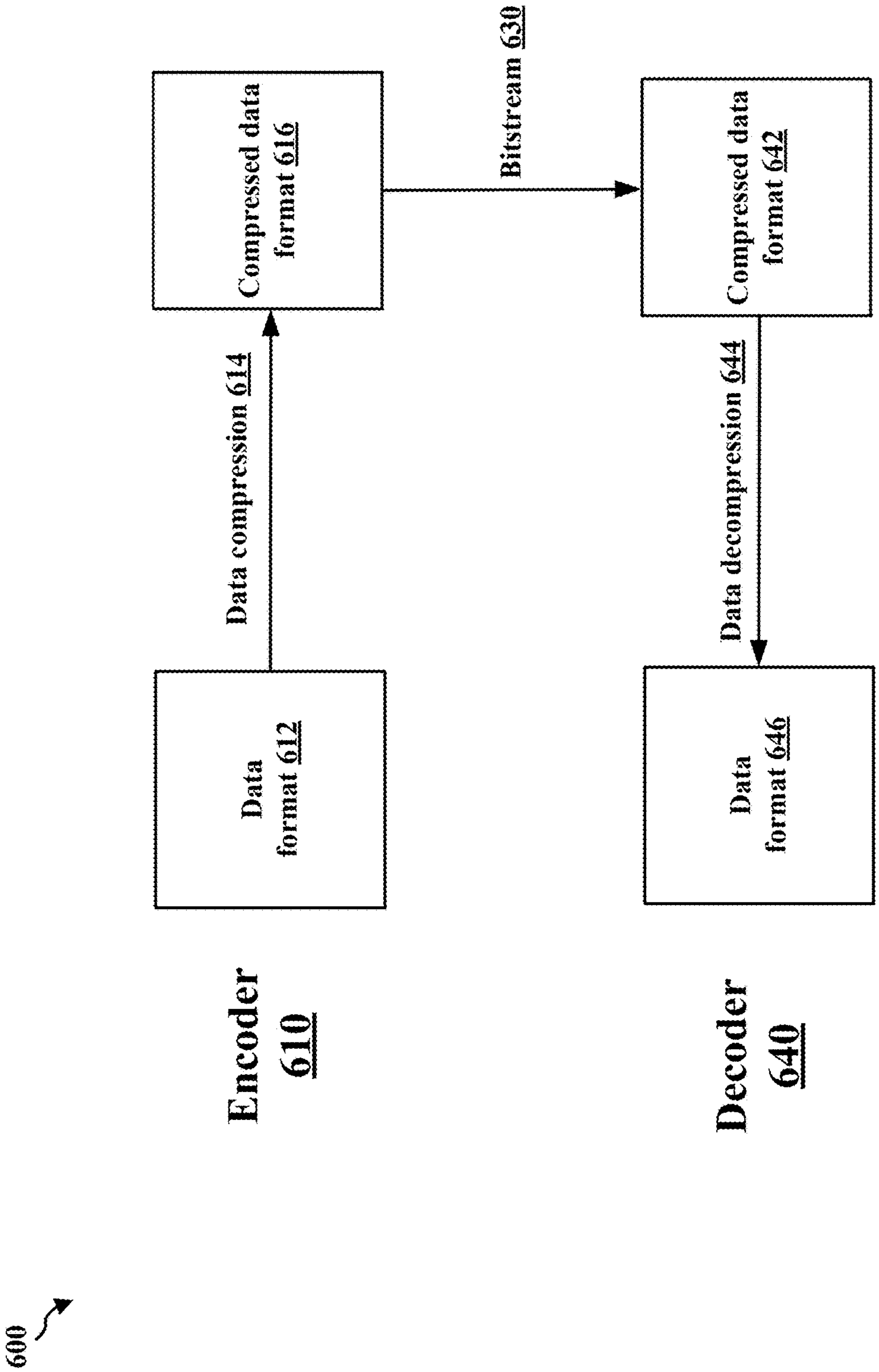
FIG. 6 is a diagram illustrating an example data compression and decompression process in accordance with one or more techniques of this disclosure.

FIG. 6 is a diagram 600 illustrating an example data compression and decompression process. More specifically, FIG. 6 depicts an example data compression and decompression process for data or graphics processing. As shown in FIG. 6, diagram 600 includes encoder 610, data format 612, data compression 614, compressed data format 616, bitstream 630, compressed data format 642, data decompression 644, data format 646, and decoder 640. FIG. 6 depicts that encoder 610 may perform data compression 614 on data format 612, which may result in compressed data format 616. The encoder 610 may store the compressed data format 616 in bitstream 630 and transmit the bitstream 630 to decoder 640. The decoder 640 may receive bitstream 630 including compressed data format 642. Next, the decoder 640 may perform data decompression 644 on data format 642, which may result in data format 646 (i.e., a decompressed data format). As such, FIG. 6 depicts that encoder 610 may perform a compression process (e.g., data compression 614) and decoder 640 may perform a decompression process (e.g., data decompression 644) for data associated with data processing or graphics processing.

In some aspects, data compression or bandwidth compression (e.g., UBWC) may utilize tiles or subtiles for the compression process. A subtile may be at least a portion of a tile. For instance, the data compression or bandwidth compression (e.g., UBWC) may utilize a tile or subtile prediction process. Also, the tile/subtile bandwidth compression may utilize a raw data comparison for the compression and/or utilize a lossless compression or lossy compression. In some instances, bandwidth reduction may be due to data compression. In some aspects, during a tile/subtile data compression, a tile may be divided or allocated into multiple subtiles (e.g., 4 subtiles) for parallel encoding and decoding. For example, a certain type of tile (e.g., an NV12 luma/Y tile) may be divided into 4 subtiles. A tile or subtile may correspond to a certain number of bytes (e.g., 256 bytes). Also, each subtitle may be coded and decoded independently. Further, the prediction for a certain pixel in a subtile (e.g., the pixel in the top row/left column of a subtile) may come from neighboring pixels (e.g., the immediately adjacent pixels or 1D neighboring pixels). There may also be a parallel processing specification for subtiles, which may mean that the subtiles are coded independently. For instance, the subtile prediction process may transmit each subtile's first pixel (e.g., the pixel in the top row/left column of a subtile) in its current form (i.e., without coding). Also, the subtile's boundary may have certain neighboring pixels as predictors (e.g., immediately adjacent pixels or 1D neighboring pixels as predictors).

Modern system-on-chips (SoCs) cover many memory-intensive use cases. As such, memory bandwidth and space is valuable and at a premium at certain devices (e.g., a GPU or CPU). Memory bandwidth compression algorithms may help to mitigate this by compressing surfaces stored in memory (e.g., system memory or graphics memory (GMEM)). For instance, both lossless and lossy bandwidth compression algorithms may compress surfaces stored in memory. Such types of compression algorithms may be ubiquitous at a system level. A few examples of these types of compression algorithms are frame buffer compression, lossy bandwidth compression, lossless bandwidth compression, and UBWC, each of which allow the compression of data. That is, bandwidth compression algorithms may allow the compression of surfaces as they are written to, and read from, main memory. For instance, a real-time system including cores may need to communicate with each other through system memory, so there may be a power benefit by compressing surfaces as they get written into memory and then decompressing them when they come out of memory. These aforementioned compression algorithms may be used by many types of intellectual property cores (e.g., a GPU, a video decoder, a display, a camera, CPU, DSP, etc.). However, at times the performance of bandwidth compression may suffer at these types of devices. Based on the above, it may be beneficial to improve the performance of certain types of bandwidth compression. Aspects of the present disclosure may improve the performance of certain types of bandwidth compression or decompression.

Aspects of the present disclosure may improve the performance of certain types of bandwidth compression or decompression. For instance, aspects of the present disclosure may improve the performance of certain types of bandwidth compression or decompression in lossless and lossy operating modes. That is, aspects presented herein may improve the performance of coding efficiency of a lossless bandwidth compression algorithms or lossy bandwidth compression algorithms. By doing so, aspects of the present disclosure may optimize the compression ratio of bandwidth compression algorithms. Aspects presented herein may also utilize methods for improving the coding efficiency of a lossless or lossy bandwidth compression algorithm. These improvements are due to leveraging the correlation between color components. These algorithmic improvements may be utilized in a bandwidth compression codec for several RGBA surface formats (e.g., formats in UBWC). Aspects presented herein may also utilize extensions of cross-component prediction to certain formats (e.g., Bayer formats).

As indicated herein, bandwidth compression may allow the compression of surfaces as they are written to, and read from, certain types of memory (e.g., main memory or system memory). Aspects presented herein may propose cross-component prediction (CCP) method for certain types of formats (e.g., RGBA and Bayer formats). Cross-component prediction may work in parallel with other types of bandwidth compression prediction (e.g., spatial prediction (SP)). In some aspects, for each subtile component within a tile, both SP and CCP may be computed, and a decision between SP and CCP may be made based on the achieved compression ratio (e.g., an encoder may make the decision). The decision may be signaled in the bitstream such that the decoder may need to parse the selected method to reconstruct. In one embodiment (e.g., RGBA-type formats), spatial prediction may be utilized for certain components (e.g., a green (G) component in an RGBA format). For the other components (e.g., red (R), blue (B), alpha (A) components), spatial prediction and cross-component prediction may be tested in parallel (e.g., tested by an encoder in parallel). The CCP subtile components may be predicted from a reconstructed subtile component (e.g., a green (G) subtile component). When testing is complete, there may be a selection between SP or CCP for each of the subtile components (e.g., red (R), blue (B), alpha (A) subtile components) based on which prediction method utilizes fewer bits for coding. In some aspects, an encoder may make the selection between SP or CCP.

In some instances, the encoder may utilize a G component as a predictor for R/B/A components. For example, the G component may need to be decoded first. Next, the encoder may check both SP and CCP, and then select one for each component (e.g., subtile). This selection may be based on entropy coding cost (e.g., using block fixed length (BFLC) coding). Also, the encoder may signal a 1-bit flag for SP or CCP in the bitstream, which may correspond to 3-bits (R/B/A) per tile. In some aspects, there may be no need to signal a first sample if CCP is selected (for R/B/A). Additionally, the encoder may choose to avoid signaling the average truncation error if CCP is selected. Moreover, the encoder may utilize two prediction paths and BFLC length calculation logic for R/B/A to support both SP and CCP paths.

As indicated herein, aspects presented herein may utilize a cross-component prediction (CCP) algorithm. This may improve the coding efficiency of a bandwidth compression codec by leveraging correlation between color components (e.g., a correlation between the green (G) color component and red/blue/alpha (R/B/A) color components in an RGBA format). In some types of bandwidth compression codecs, spatial prediction may be used to decorrelate pixel data and achieve compression due to the expectation of small residuals. In spatial prediction, each sample within a color component may be predicted from spatial neighbors. For example, a 2D parallelogram predictor may be used as follows: For a given sample x, $p(x)=L+U-UL$, where L, U, UL refer to the left, upper, and upper-left samples to x, respectively. Aspects presented herein may utilize cross-component prediction (CCP), which is a prediction method that works in parallel with spatial prediction (SP). For each subtile component within a tile (e.g., a tile of an image), both SP and CCP may be computed, and a decision between SP and CCP may be made based on the achieved compression ratio (e.g., the encoder may decide between SP and CCP based on the achieved compression ratio). This decision may be signaled in the bitstream such that a decoder may need to parse the selected method to reconstruct. One example encoder flow for SP/CCP testing and the corresponding decision is shown in FIG. 7.

In one embodiment of the aforementioned prediction process (e.g., RGBA-type formats), spatial prediction may be utilized for one component (e.g., the green (G) component). For the other components (e.g., the red/blue/alpha (R/B/A) components), spatial prediction and cross-component prediction may be tested (e.g., tested by the encoder) in parallel. In one example, testing may refer to a full prediction loop and calculation of a final syntax (e.g., including entropy-coded data and all related signaling). The cross-component prediction subtile components may be predicted from the reconstructed subtile component (e.g., the green (G) subtile component). When testing is complete, the encoder may select between SP/CCP for each of the subtile components (e.g., R/B/A subtile components) based on which prediction method utilizes less bits (i.e., select CCP when bitsCCP<bitsSP).

Figure 7:
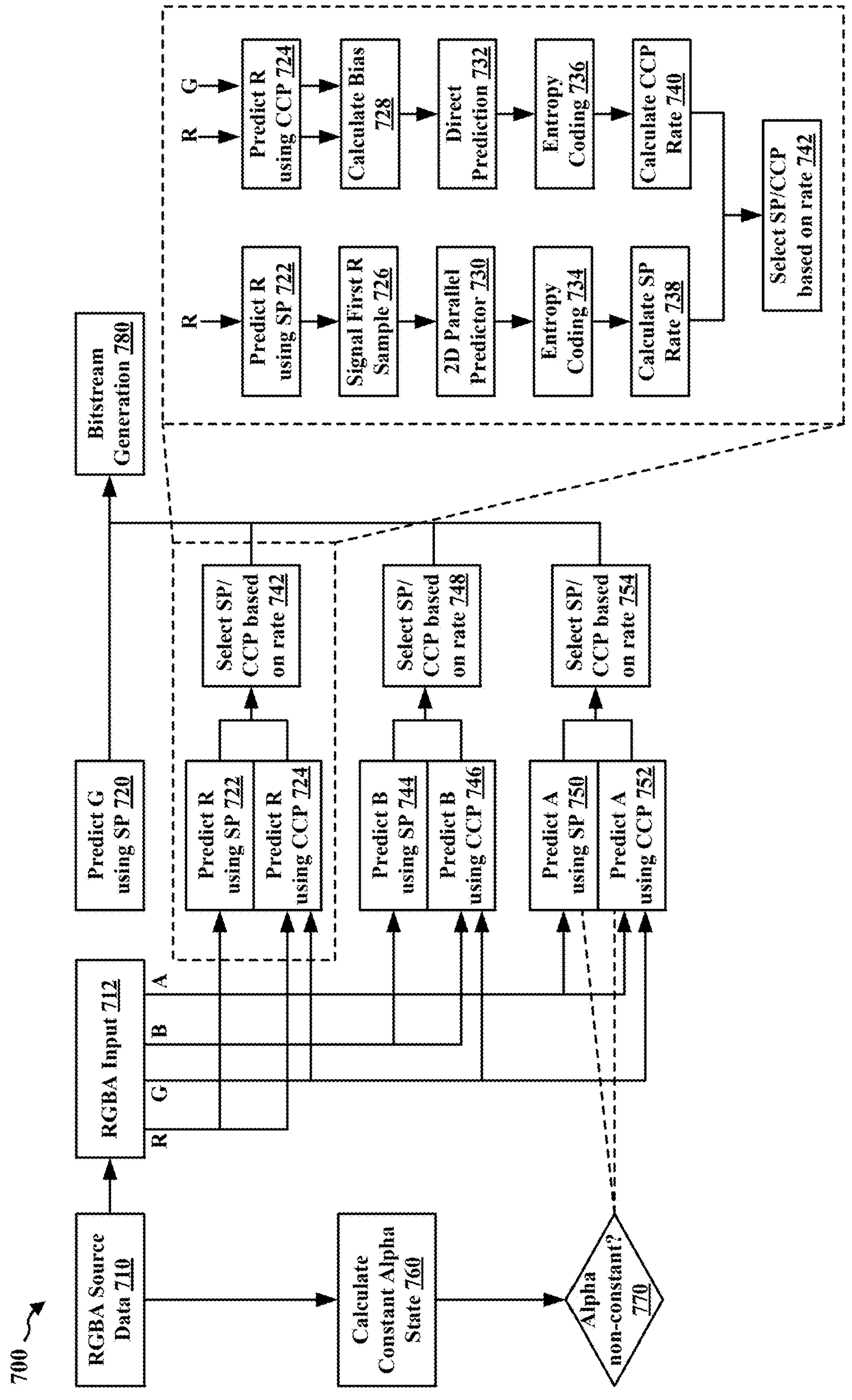
FIG. 7 is a diagram illustrating an example flow for a coding process in accordance with one or more techniques of this disclosure.

FIG. 7 illustrates diagram 700 including one example of an encoder flow (e.g., a flow for an encoder at a graphics processor) for a coding process. More specifically, diagram 700 depicts one example of an encoder flow for a spatial prediction and a cross-component prediction process. Diagram 700 includes RGBA source data 710, RGBA input 712, a number of prediction steps, a calculate constant alpha state 760, a determination if alpha is non-constant 770, and a bitstream generation 780. For example, diagram 700 depicts obtaining RGBA source data 710, inputting RGBA input 712, calculating constant alpha state 760, determining whether alpha is non-constant 770, and bitstream generation 780. FIG. 7 depicts an example cross-component prediction encoder flow with spatial and cross-component predictors shown for an RGBA format. Other formats may be supported in a similar manner as shown in FIG. 7 (e.g., a Bayer format may replace the alpha component with a second green component).

As depicted in FIG. 7, an encoder (e.g., an encoder at a graphics processor) may perform a number of different steps for the spatial prediction and a cross-component prediction process. At 720, the encoder may predict a G component using spatial prediction (SP). At 722, the encoder may predict an R component using SP. At 724, the encoder may predict an R component using cross-component prediction (CCP). As shown in FIG. 7, the steps in the dotted box near the center of FIG. 7 may be expanded to the dotted box near the right of FIG. 7. At 726, the encoder may signal a first R sample. At 728, the encoder may calculate a bias (e.g., the difference between an average of a G component and an average of an R component). At 730, the encoder may perform a 2D parallelogram predictor. At 732, the encoder may perform a direct prediction (e.g., with a bias term). At 734, the encoder may perform an entropy coding (e.g., a block fixed length coding (BFLC)). At 736, the encoder may perform an entropy coding (e.g., a block fixed length coding (BFLC)). At 738, the encoder may calculate a rate for SP. At 740, the encoder may calculate a rate for CCP. At 742, the encoder may select SP or CCP based on the rate for SP or the rate for CCP. At 744, the encoder may predict a B component using SP. At 746, the encoder may predict a B component using CCP. At 748, the encoder may select SP or CCP based on the rate for SP or the rate for CCP. At 750, the encoder may predict an A component using SP. At 752, the encoder may predict an A component using CCP. At 754, the encoder may select SP or CCP based on the rate for SP or the rate for CCP. In some aspects, a first rate of the SP (e.g., a first prediction algorithm) may be determined by coding a second source component (e.g., a red component) with the SP. The first rate of the SP may or may not be related to a coding of a first source component (e.g., a green component). Also, a second rate of the CCP (e.g., a second prediction algorithm) may be determined by performing the CCP process for the second source component (e.g., a red component), where the execution of the CCP process is based on a result of performing the SP for the first source component (e.g., a green component).

As indicated in FIG. 7, aspects presented herein may perform a cross-component prediction calculation. For example, let S represent a given subtile component and Spred be the subtile component used as the predictor. Note that this may mean cross-component prediction may not be valid for Spred and spatial prediction may be forced for this component. Next, for a given index i,j in a subtile component other than Spred, aspects presented herein may perform the following calculation: S [i,j]=Spred [i,j]+bias. In some aspects, Spred may be a predictive subtile component (e.g., a predictive subtile component computed using SP). Also, Spred may correspond to the output of block 720.

Cross-component prediction mode may leverage a bias term to remove the bias between the G subtile component and the predicted subtile component. The bias term may be calculated as the difference in pixel average of the subtile components. For example, given a subtile component with 64 samples, the subtile component average may be calculated as: avg[stc]=(sum[stc]+32)>>6. A general term for this may be provided for a subtile component with N samples, where N is a power of 2 and b=log 2(N): avg[stc]=(sum[stc]+(1<<(b−1)))>>b. Note that clipping may also be utilized depending on the averaging method used. The CCP bias term may be signaled in the bitstream for each CCP subtile component.

Aspects presented herein may also utilize a CCP bias term for unequal component bit depths. For some surface formats, two components may have different bit depths. One example of this may be a luma (Y) chroma orange (Co) chroma green (Cg) alpha (A) (YCoCgA) color space. In YCoCgA (assuming YCoCg-R invertible transform), the Co and Cg components may have one bit more than the Y component and the A component. Given an 8-bit RGBA input, the YCoCgA bit depths may be Y=8, Co=9, Cg=9, and A=8. For uneven components, the predicted component may be adjusted to match the component being predicted. In the above example, if the luma (Y) component is the predicted subtile (pred_stc) (i.e., spatial prediction is forced for Y component and other components are predicted from Y for CCP predictor) and the Co component is being predicted, then the procedure for handling uneven bit depths is given by pseudocode in Table 1 below (e.g., a procedure for handling uneven bit depths for CCP bias and CCP predictor). Note that this procedure may be modifying both the sample predictor (pred_ccp) and the bias term based on differences between the component bit depths.

TABLE 1

| Procedure for handling uneven bit depths for CCP bias and predictor |
|---|

```
data__bits__diff = pred__data__bits − curr__data__bits;
if (data__bits__diff > 0) {
   pred__ccp = pred__ccp >> data__bits__diff; // adjust predictor
   ccp__bias[stc] = avg__sample[predstc] >> data__bits__diff) −
   avg__sample[stc];
} else if (data__bits__diff == 0) {
   ccp__bias[stc] = avg__sample[predstc] − avg__sample[stc]
} else {
   pred__ccp = pred__ccp << (−data__bits__diff); // adjust predictor
   ccp__bias = avg__sample[predstc] << (−data__bits__diff)) −
   avg__sample[stc];
}
```

Aspects presented herein may also utilize CCP bias signaling. In CCP bias signaling, the CCP bias term may be signaled in the syntax such that the decoder may properly reconstruct the tile. To improve the efficiency of signaling the bias, it may be split into three syntax elements as described in Table 2 below. As shown in Table 2, for the syntax element CcpBiasSign, the number of bits may be 1. For the syntax element IsAbsCcpBiasGT, the number of bits may be 1. For the syntax element AbsoluteCcpBiasValue, the number of bits may be N.

TABLE 2

CCP bias signaling syntax elements

| Syntax element | Number of Bits |
|---|---|
| CcpBiasSign | 1 |
| IsAbsCcpBiasGT | 1 |
| AbsoluteCcpBiasValue | N |

Also, for CcpBiasSign: If the value of the bit read is “zero” then the sign of the final bias value is negative and if the value of the bit read is “one” then the sign of the bias value is positive. For IsAbsCcpBiasGT: This flag may indicate if the absolute bias is greater than a specified threshold where the threshold is based on a stored parameter (ThreshBits (“N”)) that is known to both encoder and decoder (e.g., it is fixed as a function of the surface format). The value of the threshold is: (1<<ThreshBits)−1. For example, if ThreshBits=10, then the absolute bias threshold may be 1023. For AbsCcpBiasValue: This field may be unsigned and contains the absolute value of the CCP bias. If AbsCcpBias Value is less than the threshold, then the AbsCcpBias Value may be signaled directly using a fixed length code of N which is equivalent to “ThreshBits.” If AbsCcpBiasValue is greater than the threshold, then AbsCcpBiasValue>>T is signaled instead using a fixed length code of N which is equivalent to “ThreshBits,” where T=BitDepth−ThreshBits. In one example, ThreshBits N=6 for RGBA8888 format.

Aspects presented herein may also utilize an encoder operation for CCP bias signaling. At the encoder, the absolute bias may be compared with the threshold (1<< ThreshBits)−1. If the absolute bias is less than or equal to the threshold, AbsCcpBias Value may be used directly during the prediction process. If the absolute bias is greater than the threshold, the absolute bias may be modified as described in the previous section (i.e., AbsCcpBiasValue>>T is signaled). The value of the absolute bias used by the prediction process is as follows: Absolute bias signaled in bitstream→ AbsCcpBiasValue=abs(CcpBiasValue)>>T. Also, absolute bias used by prediction→(AbsCcpBiasValue<<T)+(1<<(T−1)). Aspects presented herein may also utilize a decoder operation for CCP bias signaling. The decoder may parse the syntax elements (e.g., three syntax elements) of the CCP bias and reconstruct as follows: CcpBias=CcpBiasSign* {AbsCcpBiasValue}, if IsAbsCcpBiasGT=0. CcpBias= CcpBiasSign*{(AbsCcpBiasValue<<T)+(1<<(T−1))}, if IsAbsCcpBiasGT=1, where T=(BitDepth-ThreshBits).

Additionally, CCP information may be signaled in the header portion of the bitstream for each component for which CCP is applicable. As an example, if the green component is forced to use spatial prediction, then no CCP header information may be utilized for the green component. The following information may be utilized for a component for which CCP is applicable: One-bit flag indicating whether the component is using SP or CCP. If the component is using CCP, the bias term may be signaled.

Figure 8:
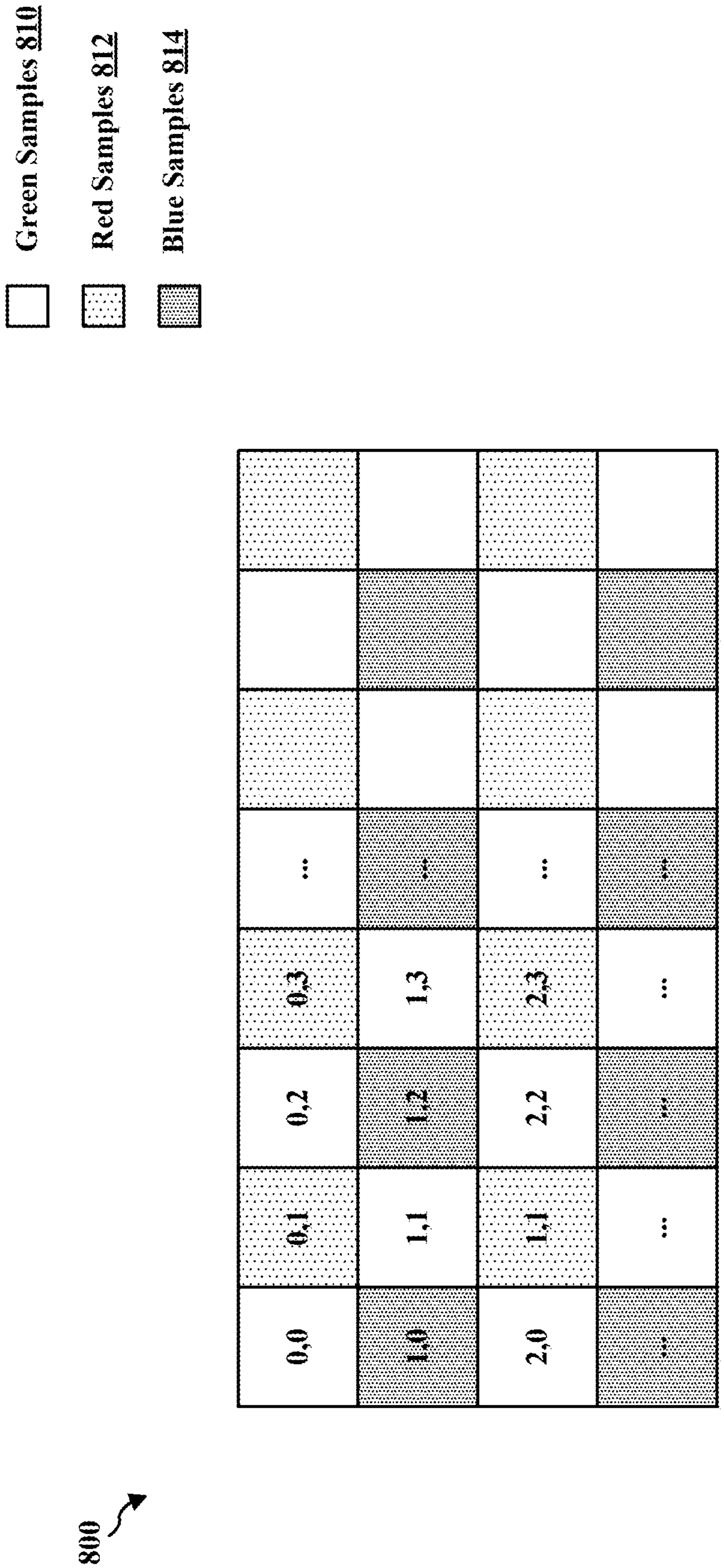
FIG. 8 is a diagram illustrating an example color filter array in accordance with one or more techniques of this disclosure.

In some aspects, cross-component prediction may be improved further for Bayer data or Bayer filters in multiple ways: using interpolation and using sample re-ordering. In CCP sample interpolation, camera sensors may use Bayer filters to capture R/G/B information. Unlike traditional display-oriented formats (e.g., RGB), each “pixel” of a Bayer camera sensor may contain data from a single color. An example Bayer filter is shown in FIG. 8. This specific type of Bayer filter may be referred to as “1xCFA,” however the approaches described herein may be extended to other filter types (e.g., NxCFA).

FIG. 8 illustrates diagram 800 including one example of a color filter array. More specifically, diagram 800 depicts one example of a Bayer filter. As shown in FIG. 8, diagram 800 includes an example of Bayer filter including green samples 810, red samples 812, and blue samples 814. Diagram 800 includes an example Bayer pattern (GRBG) for a camera sensor (e.g., a 1xCFA camera sensor). The Bayer pattern in FIG. 8 may produce a suboptimality in CCP in that no two color samples are spatially co-sited. This problem may be addressed using interpolation. In this embodiment, SP may be forced for the even row green samples ($G_{0,0}$, $G_{0,2}$, . . . ) such that this component may be used for CCP for the remaining components. For red samples, blue samples, and the odd row green samples, the prediction is as follows for the GRBG Bayer ordering: $p(R_{0,i})=(G_{0,i-1}+G_{0,min(i+1,N)})/2$. Also, $p(B_{1,i})=G_{0,i}$. Further, $p(G_{1,i})=(G_{0,i-1}+G_{0,min(i+1,N)})/2$, where N is the index of the last valid sample within the subtile component (e.g., N=7 for a component of width 8). In addition to this example, any number of other filters may be used in order to properly co-site the data.

Figure 9:
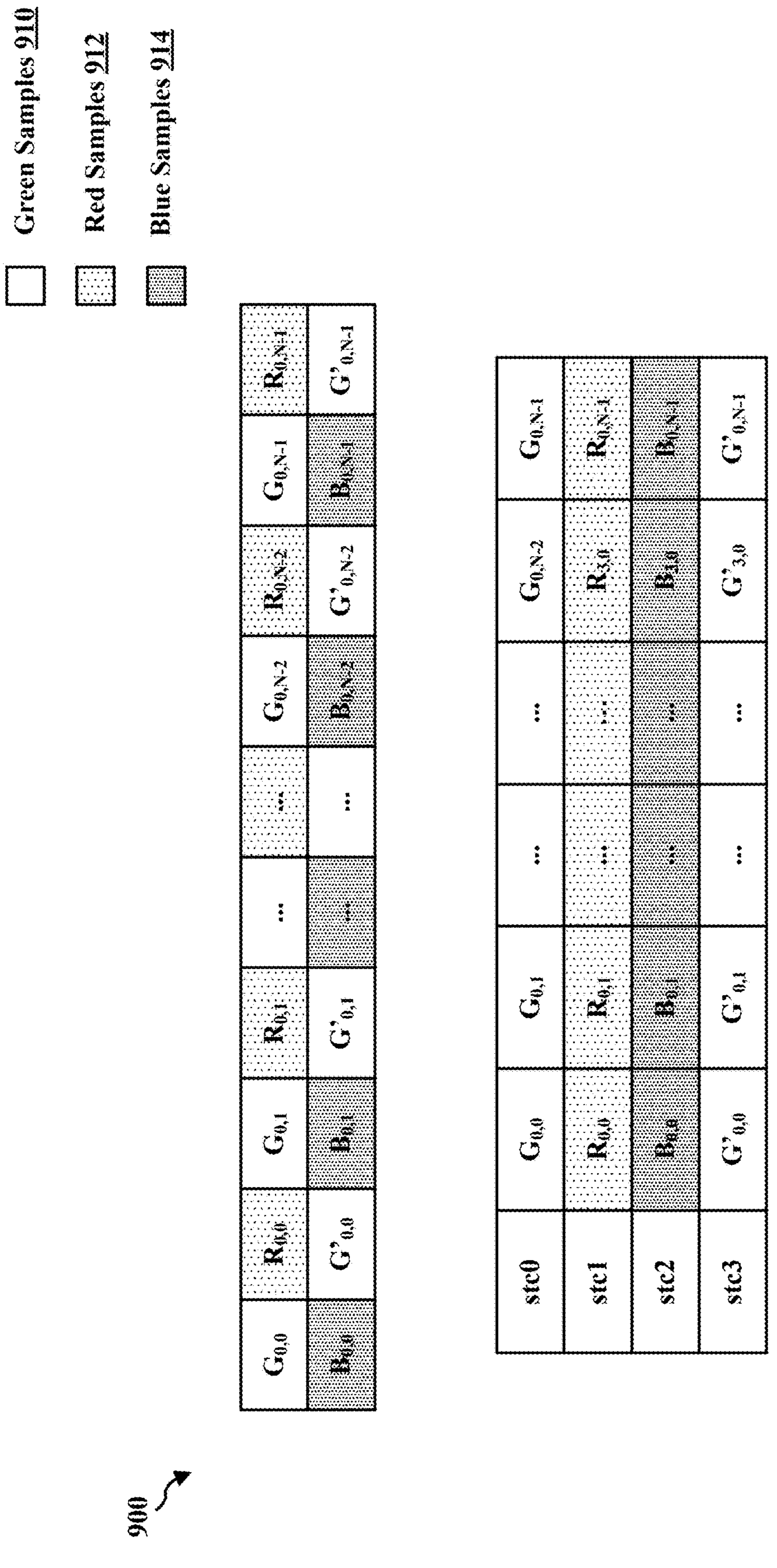
FIG. 9 is a diagram illustrating an example color filter array ordering in accordance with one or more techniques of this disclosure.
Figure 10:
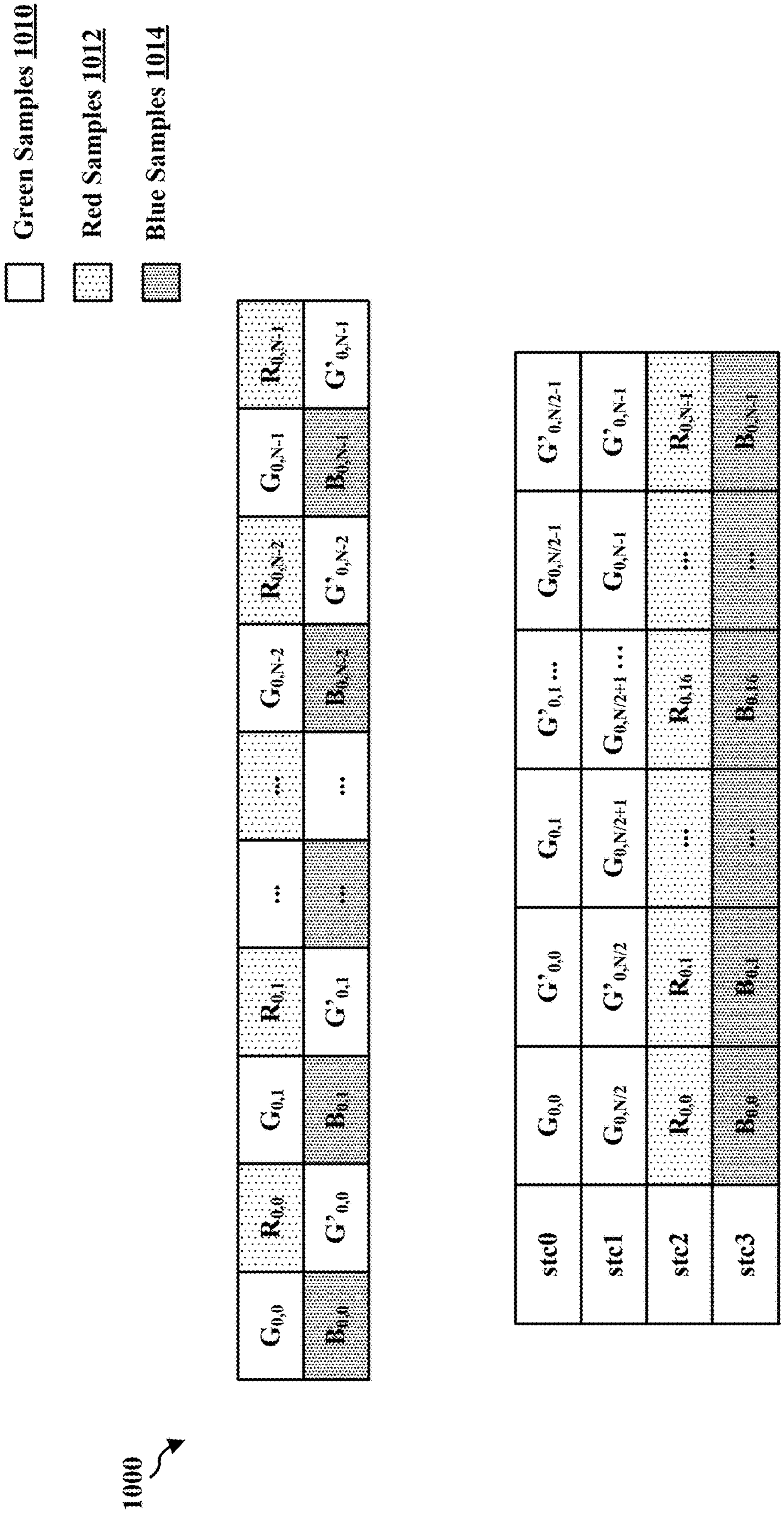
FIG. 10 is a diagram illustrating an example color filter array ordering in accordance with one or more techniques of this disclosure.

Aspects presented herein may also utilize CCP sample reordering. One approach to further improve the cross-component prediction for Bayer data is described herein. In this approach, the samples in the input tile are re-packed into an interleaved order as depicted in FIG. 8 above. FIG. 9 illustrates diagram 900 including one example of a color filter array ordering. More specifically, diagram 900 depicts one example of a Bayer ordering. As shown in FIG. 9, diagram 900 includes an example of Bayer ordering including green samples 910, red samples 912, and blue samples 914. Note that the specific Bayer ordering shown in FIG. 9 is “GRBG” 1xCFA ordering. For ease of explanation, all subsequent examples may assume this same GRBG order. The generalized equations for the predictor are given for all 1xCFA pattern types. The Bayer re-ordering for this example is shown in FIG. 10, which illustrates diagram 1000 including one example of a color filter array ordering. More specifically, diagram 1000 depicts one example of a Bayer re-ordering. As shown in FIG. 10, diagram 1000 includes an example of Bayer re-ordering including green samples 1010, red samples 1012, and blue samples 1014. In FIG. 10, the Bayer input tile re-ordered into interleaved subtiles, where subtile stc0 contains green samples interleaved from even and odd rows ($G_{0,0}/G'_{0,0}$ until $G_{0,N/2-1}/G'_{0,N/2-1}$). Also, subtile stc 1 contains green samples from interleaved from even and odd rows ($G_{0,N/2}/G'_{0,N/2}$ until $G_{0,N-1}/G'_{0,N-1}$). Further, subtile stc2 contains red samples and subtile stc3 contains blue samples.

In addition to the modification of the CCP predictors, the spatial predictor may also be updated to leverage the Bayer format. In this case, the spatial predictor for each of the subtiles stc0 and stc1 are updated as follows: p(x)=((L+LL) >>1)+U−UL, where L is the left neighbor of the current sample and LL is the second left neighbor. U and UL are above and above left samples of a current sample, which are the same padded sample in the Bayer pattern. For example, in FIG. 10, the predictor of $G_{0,1}$ may be computed by taking the average of its left (L) sample ($G'_{0,0}$) and left-to-left (LL) sample, which is $G_{0,0}$. Similarly, the predictor of $G_{0,17}$ is computed by taking the average of its left (L) sample ($G'_{0,16}$) and left-to-left (LL) sample, which is $G_{0,16}$. That is, $p(G_{0,1})=(G'_{0,0}+G_{0,0})/2$; and $p(G_{0,N/2+1})=(G'_{0,N/2}+G_{0,N/2})/2$. The generalized spatial predictor for the samples in subtiles stc0 and stc1 is as follows: $p(G_{0,i})=(G'_{0,max(i-1,0)}+G_{0,max(i-1,0)})/2$. The cross-component predictor may be modified such that the correct co-sited samples are used during the prediction. For example, samples from $R_{0,0}$ until $R_{0,N/2-1}$ and $B_{0,0}$ until $B_{0,N/2-1}$ use the co-sited samples from subtile stc0 as the predictor. For example: $p(B_{0,0})=(G'_{0,0}+G_{0,0})/2$; $p(R_{0,0})=(G'_{0,0}+G_{0,0})/2$; and $p(G_{0,N/2})=(G'_{0,0}+G_{0,0})/2$. Whereas samples from $R_{0,N/2}$ until $R_{0,N-1}$ and $B_{0,N/2}$ until $B_{0,N-1}$ use the co-sited samples from subtile stc1 as the predictor. For example, $p(B_{0,N/2})=(G'_{0,N/2}+G_{0,N/2})/2$; and $p(R_{0,N/2})=(G'_{0,N/2}+G_{0,N/2})/2$. In some aspects, the generalized cross component predictor equation is as follows: Irrespective of the Bayer pattern, the samples in the second subtile (e.g., stc1 in FIG. 10) containing interleaved G and G' samples use the co-sited samples in the first green subtile (e.g., stc0 in FIG. 10). For the other two components R and B, depending on the Bayer pattern the corresponding co-sited samples are used in the prediction, as shown in Table 3 below:

TABLE 3

CCP predictor for different Bayer types

| Bayer type | Predictor for R and B components |
|---|---|
| BGGR and GRBG | $p(B_{0,i}) = (G'_{0,max(i-1,0)} + G_{0,i} + G_{0,min(i+1,N)})/3$<br>$p(R_{0,i}) = (G'_{0,i} + G_{0,i})/2$ |
| GBRG and RGGB | $p(R_{0,i}) = (G'_{0,max(i-1,0)} + G_{0,i} + G_{0,min(i+1,N)})/3$<br>$p(B_{0,i}) = (G'_{0,i} + G_{0,i})/2$ |

In addition to the disclosure above, there may be a number of modifications that may be useful in certain applications. For instance, if the implementation is restricted to predicting R/B/A, R/B/G' from green data, the same idea may be used to predict any component. This may also apply to cross-component prediction of luma (Y) chroma (UV) (YUV) surface types, Bayer surface types, etc. That is, CCP may not be restricted to a single predicted component. As an example, Bayer data may use multiple green subtile components (e.g., even and odd samples) to predict the red and blue component data. Signaling of the CCP bias may leverage a variable-length code to further improve the coding efficiency in exchange for increased computational complexity. A weight term may be added to the CCP predictor as in the following examples: Current approach→$S=S_{pred}+bias$; and with weight term→$S=w\cdot S_{pred}+bias$. For Bayer data: Current approach→$p(x)=(G_i+G_{i+1})/2$; and with weight term→$p(x)=(w_1\cdot G_i+w_2\cdot G_{i+1})/2$.

As indicated above, the benefit of the aforementioned cross-component prediction may be an optimization of the compression ratio (e.g., an increase to the compression ratio). For example, an increase to compression ratio ranging from +1% to +6.6% depending on the surface format. In all cases, CCP may increase the observed compression ratio relative to SP alone. Note that these CR results are each an average over a large dataset, meaning that these improvements may be observed for typical data.

Aspects of the present disclosure may include a number of benefits or advantages. For instance, aspects of the present disclosure may improve the performance of certain types of bandwidth compression or decompression. Aspects of the present disclosure may also improve the performance of certain types of bandwidth compression or decompression in lossless and lossy operating modes. That is, aspects presented herein may improve the performance of coding efficiency of a lossless bandwidth compression algorithms or lossy bandwidth compression algorithms. By doing so, aspects of the present disclosure may optimize the compression ratio of bandwidth compression algorithms. Aspects presented herein may also utilize methods for improving the coding efficiency of a lossless or lossy bandwidth compression algorithms. These improvements are due to leveraging the correlation between color components. These algorithmic improvements may be utilized in bandwidth compression codec for several RGBA surface formats in bandwidth compression (e.g., formats in UBWC). Aspects presented herein may also utilize extensions of cross-component prediction to certain formats (e.g., Bayer formats).

Figure 11:
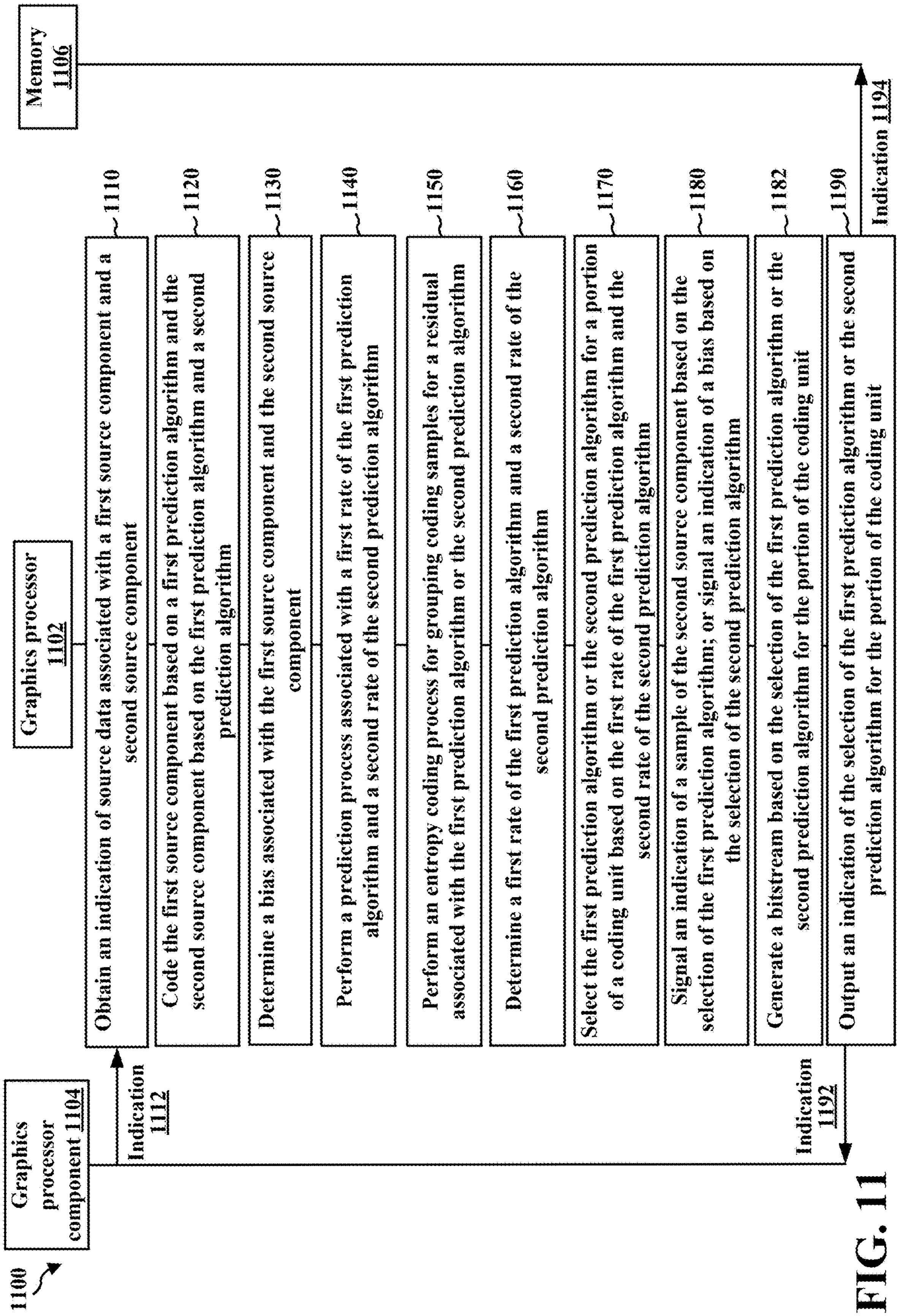
FIG. 11 is a communication flow diagram illustrating example communications between a GPU, a GPU component, and a memory in accordance with one or more techniques of this disclosure.

FIG. 11 is a communication flow diagram 1100 of graphics processing in accordance with one or more techniques of this disclosure. As shown in FIG. 11, diagram 1100 includes example communications between graphics processor 1102 (e.g., a graphics processor, a GPU, an encoder at a GPU, a shader processor at a GPU, a GPU component, another graphics processor, a CPU, a CPU component, or another central processor), graphics processor component 1104 (e.g., a graphics processor, a GPU, a decoder at a GPU, a shader processor at a GPU, a GPU component, another graphics processor, a CPU, a CPU component, or another central processor), and memory 1106 (e.g., a memory, a cache, a system memory, a graphics memory, a memory or cache at a GPU, or a memory or cache at a CPU), in accordance with one or more techniques of this disclosure.

At 1110, graphics processor 1102 may obtain an indication of source data associated with a plurality of source components (e.g., graphics processor 1102 may obtain indication 1112 from graphics processor component 1104), where the plurality of source components includes at least one first source component and at least one second source component. In some aspects, the source data may be uncompressed pixel data, and the plurality of source components may be a plurality of color components. The indication of source data may be information that indicates the source data. Also, the indication of source data may be the source data. In some aspects, obtaining the indication of source data may comprise obtaining or receiving the indication of the source data (e.g., uncompressed pixel data). Also, obtaining the indication of source data may comprise obtaining or receiving the source data (e.g., uncompressed pixel data). Also, the plurality of color components may include a plurality of red (R) green (G) blue (B) alpha (A) (RGBA) components or a plurality of RGB components.

At 1120, graphics processor 1102 may code the at least one first source component based on a first prediction algorithm and the at least one second source component based on the first prediction algorithm and a second prediction algorithm. In some aspects, the first prediction algorithm may be a spatial prediction algorithm and the second prediction algorithm may be a cross-component prediction algorithm. Also, the spatial prediction algorithm may be associated with a two-dimensional (2D) parallelogram prediction process, and the cross-component prediction algorithm may be associated with a prediction between source components included in the at least one first source component and the at least one second source component. In some aspects, coding the first source component based on the first prediction algorithm and the second source component based on the first prediction algorithm and the second prediction algorithm may comprise coding a first set of residuals for the first source component generated by the first prediction algorithm and a second set of residuals for the second source component generated by the first prediction algorithm and the second prediction algorithm. Additionally, in some aspects, coding the first source component based on the first prediction algorithm and the second source component based on the first prediction algorithm and the second prediction algorithm may comprise performing a coding process for the first source component based on the first prediction algorithm and performing a coding process for the second source component based on the first prediction algorithm and the second prediction algorithm. In some aspects, coding the first source component based on the first prediction algorithm and the second source component based on the first prediction algorithm and the second prediction algorithm may comprise estimating the first source component based on the first prediction algorithm and the second source component based on the first prediction algorithm and the second prediction algorithm.

At 1130, graphics processor 1102 may determine a bias associated with the at least one first source component and the at least one second source component. In some aspects, determining the bias associated with the at least one first source component and the at least one second source component may comprise: determining a difference between an average of the at least one first source component and an average of the at least one second source component. Also, the at least one first source component may include a first bit depth and the at least one second source component may include a second bit depth, where the first bit depth is different from the second bit depth.

At 1140, graphics processor 1102 may perform a prediction process associated with the first rate of the first prediction algorithm and the second rate of the second prediction algorithm. In some aspects, performing the prediction process associated with the first rate of the first prediction algorithm and the second rate of the second prediction algorithm may comprise: performing a two-dimensional (2D) parallelogram prediction process. Also, performing the prediction process associated with the first rate of the first prediction algorithm and the second rate of the second prediction algorithm may comprise: performing a direct prediction process or a cross-component prediction process including a bias.

At 1150, graphics processor 1102 may perform an entropy coding process for grouping a set of coding samples for a residual associated with the first prediction algorithm or the second prediction algorithm. In some aspects, entropy coding may refer to any lossless data compression method that attempts to approach a certain limit (e.g., a lower bound declared by Shannon's source coding theorem, which states that any lossless data compression method may have an expected code length greater than or equal to the entropy of the source).

At 1160, graphics processor 1102 may determine a first rate of the first prediction algorithm and a second rate of the second prediction algorithm based on the coding of the at least one first source component and the at least one second source component. In some aspects, determining the first rate and the second rate may comprise calculating the first rate and the second rate. For example, the first rate may be a first compression ratio and the second rate may be a second compression ratio.

At 1170, graphics processor 1102 may select the first prediction algorithm or the second prediction algorithm for a portion of a coding unit (e.g., the portion of the coding unit may refer to at least a portion of the coding unit) based on the first rate of the first prediction algorithm and the second rate of the second prediction algorithm. In some aspects, the portion of the coding unit may correspond to a tile of an image associated with the source data. In some aspects, the term coding unit may refer to any type of unit or component that encodes or decodes data (e.g., an encoder or a decoder at a graphics processor). For example, an SP process or a CCP process may be selected for an R/B/A component in an RGBA format. In some aspects, a compression ratio may be a measurement of a relative reduction in size of data representation produced by a data compression algorithm. Additionally, in some aspects, the first prediction algorithm or the second prediction algorithm may be selected to code or encode a portion of a coding unit, and/or predict a portion of the coding unit.

At 1180, graphics processor 1102 may signal an indication of a sample of the at least one second source component based on the selection of the first prediction algorithm; or signal an indication of a bias based on the selection of the second prediction algorithm. In some aspects, signaling the indication of the sample of the at least one second source component may comprise: signaling, to a decoder, the indication of the sample of the at least one second source component. Also, signaling the indication of the bias may comprise: signaling, to the decoder, the indication of the bias.

At 1182, graphics processor 1102 may generate a bitstream based on the selection of the first prediction algorithm or the second prediction algorithm for the portion of the coding unit. In some aspects, the bitstream may include a tile header of the portion of the coding unit which corresponds to a tile of an image associated with the source data. In some aspects, the graphics processor (e.g., an encoder at a graphics processor) may transmit the bitstream to another component or memory (e.g., display, GPU, DPU, camera, video encoder, video decoder, NSP, etc.). Additionally, in some aspects, when another component (e.g., a decoder) receives/decodes the bitstream, it may perform a number of steps (e.g., deconstruct based on the information it received from an encoder). For instance, a decoder may parse the bitstream. In the bitstream, there may be flags that inform the component (e.g., decoder) which components will use which algorithm (e.g., SP or CCP). So the component (e.g., a decoder) may conduct prediction based on the bits/instructions in the bitstream.

At 1190, graphics processor 1102 may output an indication of the selection of the first prediction algorithm or the second prediction algorithm for the portion of the coding unit. In some aspects, outputting the indication of the selection of the first prediction algorithm or the second prediction algorithm for the portion of the coding unit may comprise transmitting the indication of the selection of the first prediction algorithm or the second prediction algorithm for the portion of the coding unit (e.g., graphics processor 1102 may transmit indication 1192 to graphics processor component 1104). Also, outputting the indication of the selection of the first prediction algorithm or the second prediction algorithm for the portion of the coding unit may comprise storing the indication of the selection of the first prediction algorithm or the second prediction algorithm for the portion of the coding unit (e.g., graphics processor 1102 may store indication 1194 in memory 1106).

Figure 12:
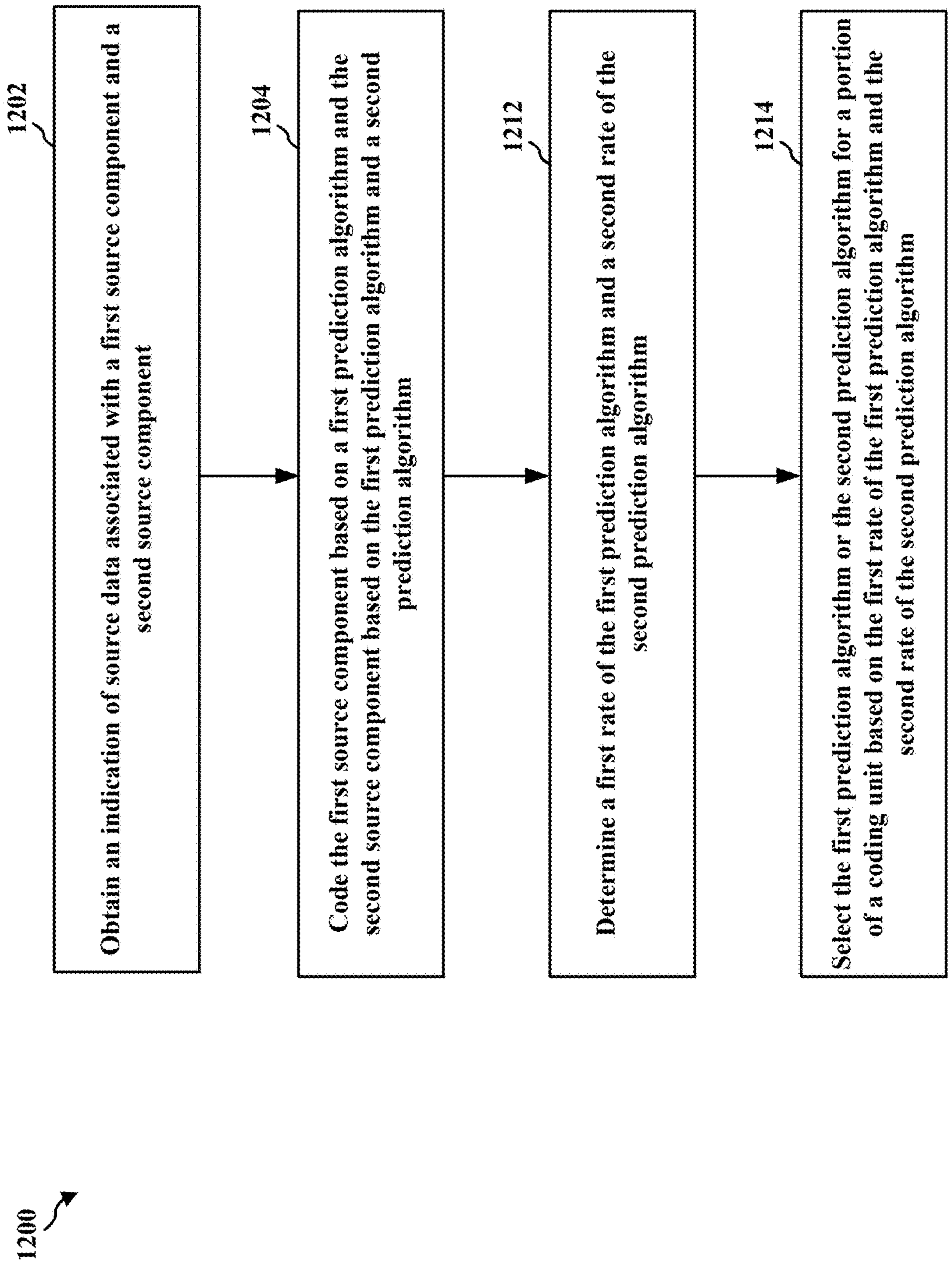
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by a graphics processor (e.g., a graphics processor, a GPU, an encoder at a GPU, a shader processor at a GPU, a GPU component, another graphics processor, a CPU, a CPU component, or another central processor), a CPU (e.g., a CPU, a CPU component, another central processor, a GPU, an encoder at a GPU, a shader processor at a GPU, a GPU component, or another graphics processor), a display driver integrated circuit (DDIC), an apparatus for graphics processing, a wireless communication device, and/or any apparatus that may perform graphics processing as used in connection with the examples of FIGS. 1-11.

At 1202, the graphics processor may obtain an indication of source data associated with a plurality of source components, where the plurality of source components includes at least one first source component and at least one second source component, as described in connection with the examples in FIGS. 1-11. For example, as described in 1110 of FIG. 11, graphics processor 1102 may obtain an indication of source data associated with a plurality of source components, where the plurality of source components includes at least one first source component and at least one second source component. Further, step 1202 may be performed by processing unit 120 in FIG. 1. In some aspects, the source data may be uncompressed pixel data, and the plurality of source components may be a plurality of color components. Also, the plurality of color components may include a plurality of red (R) green (G) blue (B) alpha (A) (RGBA) components or a plurality of RGB components.

At 1204, the graphics processor may code the at least one first source component based on a first prediction algorithm and the at least one second source component based on the first prediction algorithm and a second prediction algorithm, as described in connection with the examples in FIGS. 1-11. For example, as described in 1120 of FIG. 11, graphics processor 1102 may estimate the at least one first source component based on a first prediction algorithm and the at least one second source component based on the first prediction algorithm or a second prediction algorithm. Further, step 1204 may be performed by processing unit 120 in FIG. 1. In some aspects, the first prediction algorithm may be a spatial prediction algorithm and the second prediction algorithm may be a cross-component prediction algorithm. Also, the spatial prediction algorithm may be associated with a two-dimensional (2D) parallelogram prediction process, and the cross-component prediction algorithm may be associated with a prediction between source components included in the at least one first source component and the at least one second source component. In some aspects, coding the first source component based on the first prediction algorithm and the second source component based on the first prediction algorithm and the second prediction algorithm may comprise coding a first set of residuals for the first source component generated by the first prediction algorithm and a second set of residuals for the second source component generated by the first prediction algorithm and the second prediction algorithm. Additionally, in some aspects, coding the first source component based on the first prediction algorithm and the second source component based on the first prediction algorithm and the second prediction algorithm may comprise performing a coding process for the first source component based on the first prediction algorithm and performing a coding process for the second source component based on the first prediction algorithm and the second prediction algorithm. In some aspects, coding the first source component based on the first prediction algorithm and the second source component based on the first prediction algorithm and the second prediction algorithm may comprise estimating the first source component based on the first prediction algorithm and the second source component based on the first prediction algorithm and the second prediction algorithm.

At 1212, the graphics processor may determine a first rate of the first prediction algorithm and a second rate of the second prediction algorithm based on the estimation of the at least one first source component and the at least one second source component, as described in connection with the examples in FIGS. 1-11. For example, as described in 1160 of FIG. 11, graphics processor 1102 may calculate a first rate of the first prediction algorithm and a second rate of the second prediction algorithm based on the coding of the at least one first source component and the at least one second source component. Further, step 1212 may be performed by processing unit 120 in FIG. 1.

At 1214, the graphics processor may select the first prediction algorithm or the second prediction algorithm for a portion of a coding unit based on the first rate of the first prediction algorithm and the second rate of the second prediction algorithm, as described in connection with the examples in FIGS. 1-11. For example, as described in 1170 of FIG. 11, graphics processor 1102 may select the first prediction algorithm or the second prediction algorithm for a portion of a coding unit based on the first rate of the first prediction algorithm and the second rate of the second prediction algorithm. Further, step 1214 may be performed by processing unit 120 in FIG. 1. In some aspects, the portion of the coding unit may correspond to a tile of an image associated with the source data.

Figure 13:
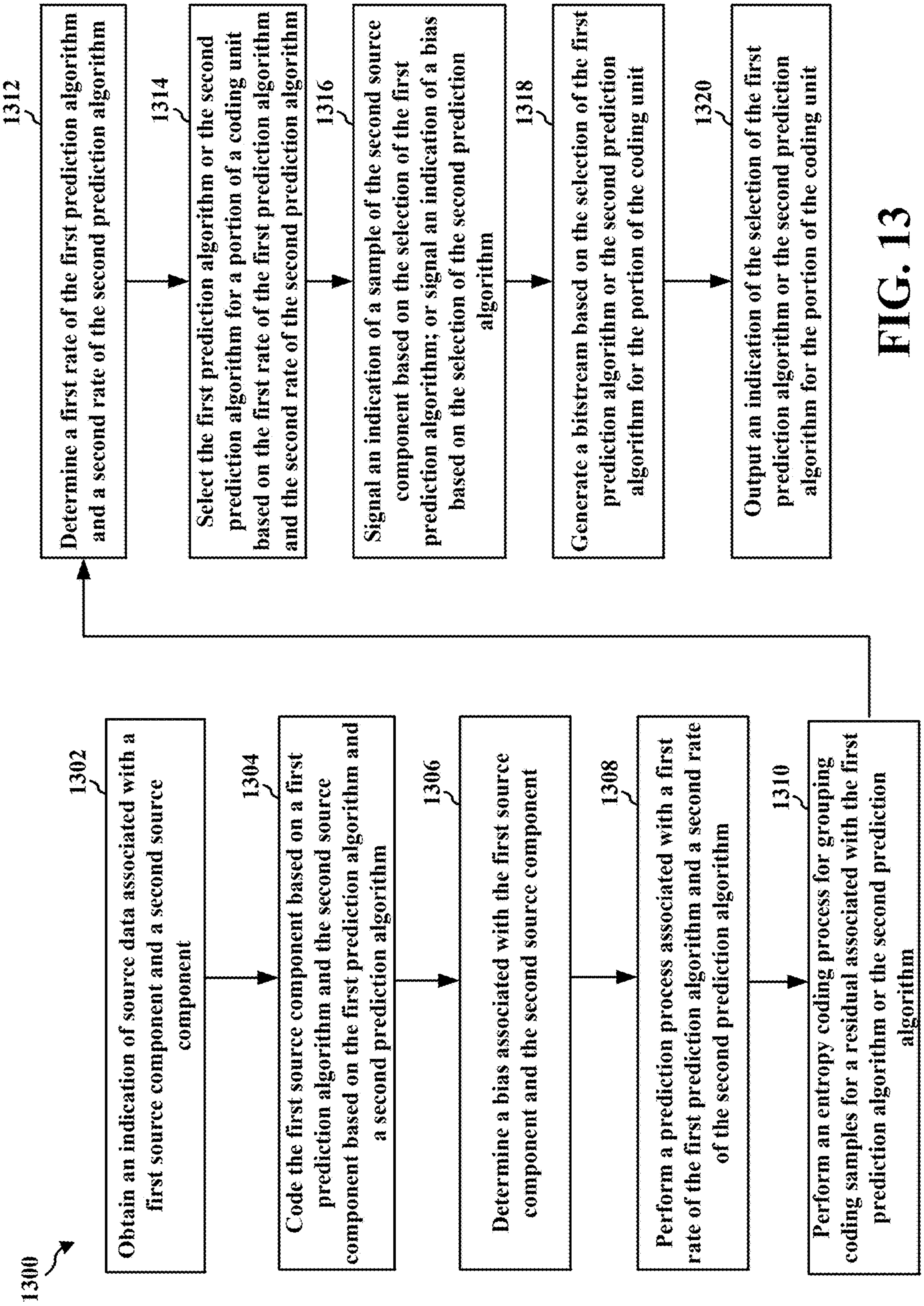
FIG. 13 is a flowchart of an example method of graphics processing in accordance with one or more techniques of this disclosure.

FIG. 13 is a flowchart 1300 of an example method of graphics processing in accordance with one or more techniques of this disclosure. The method may be performed by a graphics processor (e.g., a graphics processor, a GPU, an encoder at a GPU, a shader processor at a GPU, a GPU component, another graphics processor, a CPU, a CPU component, or another central processor), a CPU (e.g., a CPU, a CPU component, another central processor, a GPU, an encoder at a GPU, a shader processor at a GPU, a GPU component, or another graphics processor), a display driver integrated circuit (DDIC), an apparatus for graphics processing, a wireless communication device, and/or any apparatus that may perform graphics processing as used in connection with the examples of FIGS. 1-11.

At 1302, the graphics processor may obtain an indication of source data associated with a plurality of source components, where the plurality of source components includes at least one first source component and at least one second source component, as described in connection with the examples in FIGS. 1-11. For example, as described in 1110 of FIG. 11, graphics processor 1102 may obtain an indication of source data associated with a plurality of source components, where the plurality of source components includes at least one first source component and at least one second source component. Further, step 1302 may be performed by processing unit 120 in FIG. 1. In some aspects, the source data may be uncompressed pixel data, and the plurality of source components may be a plurality of color components. Also, the plurality of color components may include a plurality of red (R) green (G) blue (B) alpha (A) (RGBA) components or a plurality of RGB components.

At 1304, the graphics processor may code the at least one first source component based on a first prediction algorithm and the at least one second source component based on the first prediction algorithm and a second prediction algorithm, as described in connection with the examples in FIGS. 1-11. For example, as described in 1120 of FIG. 11, graphics processor 1102 may estimate the at least one first source component based on a first prediction algorithm and the at least one second source component based on the first prediction algorithm or a second prediction algorithm. Further, step 1304 may be performed by processing unit 120 in FIG. 1. In some aspects, the first prediction algorithm may be a spatial prediction algorithm and the second prediction algorithm may be a cross-component prediction algorithm. Also, the spatial prediction algorithm may be associated with a two-dimensional (2D) parallelogram prediction process, and the cross-component prediction algorithm may be associated with a prediction between source components included in the at least one first source component and the at least one second source component. In some aspects, coding the first source component based on the first prediction algorithm and the second source component based on the first prediction algorithm and the second prediction algorithm may comprise coding a first set of residuals for the first source component generated by the first prediction algorithm and a second set of residuals for the second source component generated by the first prediction algorithm and the second prediction algorithm. Additionally, in some aspects, coding the first source component based on the first prediction algorithm and the second source component based on the first prediction algorithm and the second prediction algorithm may comprise performing a coding process for the first source component based on the first prediction algorithm and performing a coding process for the second source component based on the first prediction algorithm and the second prediction algorithm. In some aspects, coding the first source component based on the first prediction algorithm and the second source component based on the first prediction algorithm and the second prediction algorithm may comprise estimating the first source component based on the first prediction algorithm and the second source component based on the first prediction algorithm and the second prediction algorithm.

At 1306, the graphics processor may determine a bias associated with the at least one first source component and the at least one second source component, as described in connection with the examples in FIGS. 1-11. For example, as described in 1130 of FIG. 11, graphics processor 1102 may calculate a bias associated with the at least one first source component and the at least one second source component. Further, step 1306 may be performed by processing unit 120 in FIG. 1. In some aspects, determining the bias associated with the at least one first source component and the at least one second source component may comprise: determining a difference between an average of the at least one first source component and an average of the at least one second source component. Also, the at least one first source component may include a first bit depth and the at least one second source component may include a second bit depth, where the first bit depth is different from the second bit depth.

At 1308, the graphics processor may perform a prediction process associated with the first rate of the first prediction algorithm and the second rate of the second prediction algorithm, as described in connection with the examples in FIGS. 1-11. For example, as described in 1140 of FIG. 11, graphics processor 1102 may perform a prediction process associated with the first rate of the first prediction algorithm and the second rate of the second prediction algorithm. Further, step 1308 may be performed by processing unit 120 in FIG. 1. In some aspects, performing the prediction process associated with the first rate of the first prediction algorithm and the second rate of the second prediction algorithm may comprise: performing a two-dimensional (2D) parallelogram prediction process. Also, performing the prediction process associated with the first rate of the first prediction algorithm and the second rate of the second prediction algorithm may comprise: performing a direct prediction process or a cross-component prediction process including a bias.

At 1310, the graphics processor may perform an entropy coding process for grouping a set of coding samples for a residual associated with the first prediction algorithm or the second prediction algorithm, as described in connection with the examples in FIGS. 1-11. For example, as described in 1150 of FIG. 11, graphics processor 1102 may perform an entropy coding process for grouping a set of coding samples for a residual associated with the first prediction algorithm or the second prediction algorithm. Further, step 1310 may be performed by processing unit 120 in FIG. 1.

At 1312, the graphics processor may determine a first rate of the first prediction algorithm and a second rate of the second prediction algorithm based on the coding of the at least one first source component and the at least one second source component, as described in connection with the examples in FIGS. 1-11. For example, as described in 1160 of FIG. 11, graphics processor 1102 may calculate a first rate of the first prediction algorithm and a second rate of the second prediction algorithm based on the estimation of the at least one first source component and the at least one second source component. Further, step 1312 may be performed by processing unit 120 in FIG. 1.

At 1314, the graphics processor may select the first prediction algorithm or the second prediction algorithm for a portion of a coding unit based on the first rate of the first prediction algorithm and the second rate of the second prediction algorithm, as described in connection with the examples in FIGS. 1-11. For example, as described in 1170 of FIG. 11, graphics processor 1102 may select the first prediction algorithm or the second prediction algorithm for a portion of a coding unit based on the first rate of the first prediction algorithm and the second rate of the second prediction algorithm. Further, step 1314 may be performed by processing unit 120 in FIG. 1. In some aspects, the portion of the coding unit may correspond to a tile of an image associated with the source data.

At 1316, the graphics processor may signal an indication of a sample of the at least one second source component based on the selection of the first prediction algorithm; or signal an indication of a bias based on the selection of the second prediction algorithm, as described in connection with the examples in FIGS. 1-11. For example, as described in 1180 of FIG. 11, graphics processor 1102 may signal an indication of a sample of the at least one second source component based on the selection of the first prediction algorithm; or signal an indication of a bias based on the selection of the second prediction algorithm. Further, step 1316 may be performed by processing unit 120 in FIG. 1. In some aspects, signaling the indication of the sample of the at least one second source component may comprise: signaling, to a decoder, the indication of the sample of the at least one second source component. Also, signaling the indication of the bias may comprise: signaling, to the decoder, the indication of the bias.

At 1318, the graphics processor may generate a bitstream based on the selection of the first prediction algorithm or the second prediction algorithm for the portion of the coding unit, as described in connection with the examples in FIGS. 1-11. For example, as described in 1182 of FIG. 11, graphics processor 1102 may generate a bitstream based on the selection of the first prediction algorithm or the second prediction algorithm for the portion of the coding unit. Further, step 1318 may be performed by processing unit 120 in FIG. 1. In some aspects, the bitstream may include a tile header of the portion of the coding unit which corresponds to a tile of an image associated with the source data. In some aspects, the graphics processor (e.g., an encoder at a graphics processor) may transmit the bitstream to another component or memory (e.g., display, GPU, DPU, camera, video encoder, video decoder, NSP, etc.). Additionally, in some aspects, when another component (e.g., a decoder) receives/decodes the bitstream, it may perform a number of steps (e.g., deconstruct based on the information it received from an encoder). For instance, a decoder may parse the bitstream. In the bitstream, there may be flags that inform the component (e.g., decoder) which components will use which algorithm (e.g., SP or CCP). So the component (e.g., a decoder) may conduct prediction based on the bits/instructions in the bitstream.

At 1320, the graphics processor may output an indication of the selection of the first prediction algorithm or the second prediction algorithm for the portion of the coding unit, as described in connection with the examples in FIGS. 1-11. For example, as described in 1190 of FIG. 11, graphics processor 1102 may output an indication of the selection of the first prediction algorithm or the second prediction algorithm for the portion of the coding unit. Further, step 1320 may be performed by processing unit 120 in FIG. 1. In some aspects, outputting the indication of the selection of the first prediction algorithm or the second prediction algorithm for the portion of the coding unit may comprise transmitting the indication of the selection of the first prediction algorithm or the second prediction algorithm for the portion of the coding unit. Also, outputting the indication of the selection of the first prediction algorithm or the second prediction algorithm for the portion of the coding unit may comprise storing the indication of the selection of the first prediction algorithm or the second prediction algorithm for the portion of the coding unit.

In configurations, a method or an apparatus for graphics processing is provided. The apparatus may be a GPU (or other graphics processor), a CPU (or other central processor), a DDIC, an apparatus for graphics processing, and/or some other processor that may perform graphics processing. In aspects, the apparatus may be the processing unit 120 within the device 104, or may be some other hardware within the device 104 or another device. The apparatus, e.g., processing unit 120, may include means for obtaining an indication of source data associated with a plurality of source components, where the plurality of source components includes at least one first source component and at least one second source component. The apparatus, e.g., processing unit 120, may also include means for coding the at least one first source component based on a first prediction algorithm and the at least one second source component based on the first prediction algorithm and a second prediction algorithm. The apparatus, e.g., processing unit 120, may also include means for determining a first rate of the first prediction algorithm and a second rate of the second prediction algorithm based on the estimation of the at least one first source component and the at least one second source component. The apparatus, e.g., processing unit 120, may also include means for selecting the first prediction algorithm or the second prediction algorithm for a portion of a coding unit based on the first rate of the first prediction algorithm and the second rate of the second prediction algorithm. The apparatus, e.g., processing unit 120, may also include means for performing a prediction process associated with the first rate of the first prediction algorithm and the second rate of the second prediction algorithm. The apparatus, e.g., processing unit 120, may also include means for determining a bias associated with the at least one first source component and the at least one second source component. The apparatus, e.g., processing unit 120, may also include means for signaling an indication of a sample of the at least one second source component based on the selection of the first prediction algorithm; or means for signaling an indication of a bias based on the selection of the second prediction algorithm. The apparatus, e.g., processing unit 120, may also include means for generating a bitstream based on the selection of the first prediction algorithm or the second prediction algorithm for the portion of the coding unit. The apparatus, e.g., processing unit 120, may also include means for performing an entropy coding process for grouping a set of coding samples for a residual associated with the first prediction algorithm or the second prediction algorithm. The apparatus, e.g., processing unit 120, may also include means for outputting an indication of the selection of the first prediction algorithm or the second prediction algorithm for the portion of the coding unit.

The subject matter described herein may be implemented to realize one or more benefits or advantages. For instance, the described graphics processing techniques may be used by a GPU, an encoder, a CPU, a central processor, or some other processor that may perform graphics processing to implement the cross-component prediction techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize cross-component prediction techniques in order to improve memory bandwidth efficiency and/or increase processing speed at a GPU, an encoder, a CPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including a memory and a processor coupled to the memory and, based on information stored in the memory, the processor is configured to (e.g., a processor coupled to the memory and configured to) (e.g., a processor coupled to the memory and configured to use information stored in the memory to): obtain an indication of source data associated with a plurality of source components (e.g., obtain source data comprising a plurality of source components), wherein the plurality of source components includes a first source component and a second source component; code the first source component based on a first prediction algorithm and the second source component based on the first prediction algorithm and a second prediction algorithm (e.g., encode the first component using a first prediction algorithm (e.g., a spatial prediction algorithm) and encode the second component using the first prediction algorithm and a second prediction algorithm (e.g., a cross-component prediction algorithm)); determine a first rate (e.g., a first compression ratio) of the first prediction algorithm and a second rate (e.g., a second compression ratio) of the second prediction algorithm based on the estimation of the first source component and the second source component; and select the first prediction algorithm or the second prediction algorithm for a portion of a coding unit based on the first rate of the first prediction algorithm and the second rate of the second prediction algorithm.

Aspect 2 is the apparatus of aspect 1, wherein the processor is further configured to: perform a prediction process associated with the first rate of the first prediction algorithm and the second rate of the second prediction algorithm (e.g., perform a prediction process using the first rate of the first prediction algorithm and using the second rate of the second prediction algorithm).

Aspect 3 is the apparatus of aspect 2, wherein to perform the prediction process associated with the first rate of the first prediction algorithm and the second rate of the second prediction algorithm, the processor is configured to: perform a two-dimensional (2D) parallelogram prediction process.

Aspect 4 is the apparatus of aspect 2, wherein to perform the prediction process associated with the first rate of the first prediction algorithm and the second rate of the second prediction algorithm, the processor is configured to: perform a direct prediction process or a cross-component prediction process including a bias (e.g., a bias between a predictive component and the predicted component). The term bias may refer to a statistical weight associated with data or a component utilized in data processing, graphics processing, or color processing.

Aspect 5 is the apparatus of any of aspects 1 to 4, wherein the processor is further configured to: determine a bias associated with the first source component and the second source component (e.g., a bias between the first source (e.g., a predictive component) and the second source component (e.g., a predicted component)).

Aspect 6 is the apparatus of aspect 5, wherein to determine the bias associated with the first source component and the second source component, the processor is configured to: determine a difference between an average of the first source component and an average of the second source component.

Aspect 7 is the apparatus of any of aspects 5 to 6, wherein the first source component includes a first bit depth (e.g., the first source component has a first bit depth) and the second source component includes a second bit depth (e.g., the second source component has a second bit depth), and wherein the first bit depth is different from the second bit depth.

Aspect 8 is the apparatus of any of aspects 1 to 7, wherein the processor is further configured to: signal an indication of a sample of the second source component based on the selection of the first prediction algorithm (e.g., signal a sample of the second source component); or signal an indication of a bias based on the selection of the second prediction algorithm (e.g., signal a bias). The term bias may refer to a statistical weight associated with data or a component utilized in data processing, graphics processing, or color processing.

Aspect 9 is the apparatus of aspect 8, wherein to signal the indication of the sample of the second source component, the processor is configured to: signal, to a decoder, the indication of the sample of the second source component; or wherein to signal the indication of the bias, the processor is configured to: signal, to the decoder, the indication of the bias.

Aspect 10 is the apparatus of any of aspects 1 to 9, wherein the processor is further configured to: generate a bitstream based on the selection of the first prediction algorithm or the second prediction algorithm for the portion of the coding unit.

Aspect 11 is the apparatus of aspect 10, wherein the bitstream includes a tile header of the portion of the coding unit which corresponds to a tile of an image associated with the source data.

Aspect 12 is the apparatus of any of aspects 1 to 11, wherein the first prediction algorithm is a spatial prediction algorithm and the second prediction algorithm is a cross-component prediction algorithm.

Aspect 13 is the apparatus of aspect 12, wherein the spatial prediction algorithm is associated with a two-dimensional (2D) parallelogram prediction process, and wherein the cross-component prediction algorithm is associated with a prediction between source components included in the first source component and the second source component.

Aspect 14 is the apparatus of any of aspects 1 to 13, wherein the processor is further configured to: perform an entropy coding process for grouping a set of coding samples for a residual associated with the first prediction algorithm or the second prediction algorithm.

Aspect 15 is the apparatus of any of aspects 1 to 14, wherein the portion of the coding unit corresponds to a tile of an image associated with the source data.

Aspect 16 is the apparatus of any of aspects 1 to 15, wherein the source data is uncompressed pixel data, and wherein the plurality of source components is a plurality of color components.

Aspect 17 is the apparatus of aspect 16, wherein the plurality of color components includes a plurality of red (R) green (G) blue (B) alpha (A) (RGBA) components or a plurality of RGB components.

Aspect 18 is the apparatus of any of aspects 1 to 17, wherein to code the at least one first source component based on the first prediction algorithm and the at least one second source component based on the first prediction algorithm and the second prediction algorithm, the processor is configured to code a first set of residuals for the first source component generated by the first prediction algorithm and a second set of residuals for the second source component generated by the first prediction algorithm and the second prediction algorithm.

Aspect 19 is the apparatus of any of aspects 1 to 18, wherein the processor is further configured to: output an indication of the selection of the first prediction algorithm or the second prediction algorithm for the portion of the coding unit.

Aspect 20 is the apparatus of aspect 19, wherein the apparatus is a wireless communication device, further including (i.e., comprising) at least one of an antenna or a transceiver coupled to the processor, wherein to output the indication of the selection of the first prediction algorithm or the second prediction algorithm for the portion of the coding unit, the processor is configured to: transmit, via at least one of the antenna or the transceiver, the indication of the selection of the first prediction algorithm or the second prediction algorithm for the portion of the coding unit; or store the indication of the selection of the first prediction algorithm or the second prediction algorithm for the portion of the coding unit.

Aspect 21 is a method of graphics processing for implementing any of aspects 1 to 20.

Aspect 22 is an apparatus for graphics processing including means for implementing any of aspects 1 to 20.

Aspect 23 is a computer-readable medium (e.g., a non-transitory computer-readable medium) storing computer executable code (e.g., code for graphics processing), the code when executed by a processor causes the processor to implement any of aspects 1 to 20.

What is claimed is:

1. An apparatus for graphics processing, comprising:

a memory; and a processor coupled to the memory and, based on information stored in the memory, the processor is configured to:

obtain an indication of source data associated with a plurality of source components, wherein the plurality of source components includes a first source component and a second source component;

code the first source component based on a first prediction algorithm and the second source component based on the first prediction algorithm and a second prediction algorithm;

determine a first rate of the first prediction algorithm and a second rate of the second prediction algorithm based on the coding of the first source component and the second source component; and select the first prediction algorithm or the second prediction algorithm for a portion of a coding unit based on the first rate of the first prediction algorithm and the second rate of the second prediction algorithm.

2. The apparatus of claim 1, wherein the processor is further configured to:

perform a prediction process associated with the first rate of the first prediction algorithm and the second rate of the second prediction algorithm.

3. The apparatus of claim 2, wherein to perform the prediction process associated with the first rate of the first prediction algorithm and the second rate of the second prediction algorithm, the processor is configured to:

perform a two-dimensional (2D) parallelogram prediction process.

4. The apparatus of claim 2, wherein to perform the prediction process associated with the first rate of the first prediction algorithm and the second rate of the second prediction algorithm, the processor is configured to:

perform a direct prediction process or a cross-component prediction process including a bias.

5. The apparatus of claim 1, wherein the processor is further configured to:

determine a bias associated with the first source component and the second source component.

6. The apparatus of claim 5, wherein to determine the bias associated with the first source component and the second source component, the processor is configured to:

determine a difference between an average of the first source component and an average of the second source component.

7. The apparatus of claim 5, wherein the first source component includes a first bit depth and the second source component includes a second bit depth, and wherein the first bit depth is different from the second bit depth.

8. The apparatus of claim 1, wherein the processor is further configured to:

signal an indication of a sample of the second source component based on the selection of the first prediction algorithm; or signal an indication of a bias based on the selection of the second prediction algorithm.

9. The apparatus of claim 8, wherein to signal the indication of the sample of the second source component, the processor is configured to: signal, to a decoder, the indication of the sample of the second source component; or wherein to signal the indication of the bias, the processor is configured to: signal, to the decoder, the indication of the bias.

10. The apparatus of claim 1, wherein the processor is further configured to:

generate a bitstream based on the selection of the first prediction algorithm or the second prediction algorithm for the portion of the coding unit.

11. The apparatus of claim 10, wherein the bitstream includes a tile header of the portion of the coding unit which corresponds to a tile of an image associated with the source data.

12. The apparatus of claim 1, wherein the first prediction algorithm is a spatial prediction algorithm and the second prediction algorithm is a cross-component prediction algorithm.

13. The apparatus of claim 12, wherein the spatial prediction algorithm is associated with a two-dimensional (2D) parallelogram prediction process, and wherein the cross-component prediction algorithm is associated with a prediction between source components included in the first source component and the second source component.

14. The apparatus of claim 1, wherein the processor is further configured to:

perform an entropy coding process for grouping a set of coding samples for a residual associated with the first prediction algorithm or the second prediction algorithm.

15. The apparatus of claim 1, wherein the portion of the coding unit corresponds to a tile of an image associated with the source data, wherein the source data is uncompressed pixel data, and wherein the plurality of source components is a plurality of color components, and wherein the plurality of color components includes a plurality of red (R) green (G) blue (B) alpha (A) (RGBA) components or a plurality of RGB components.

16. The apparatus of claim 1, wherein to code the first source component based on the first prediction algorithm and the second source component based on the first prediction algorithm and the second prediction algorithm, the processor is configured to:

code a first set of residuals for the first source component generated by the first prediction algorithm and a second set of residuals for the second source component generated by the first prediction algorithm and the second prediction algorithm.

17. The apparatus of claim 1, wherein the processor is further configured to:

output an indication of the selection of the first prediction algorithm or the second prediction algorithm for the portion of the coding unit.

18. The apparatus of claim 17, wherein the apparatus is a wireless communication device, wherein to output the indication of the selection of the first prediction algorithm or the second prediction algorithm for the portion of the coding unit, the processor is configured to:

transmit the indication of the selection of the first prediction algorithm or the second prediction algorithm for the portion of the coding unit; or store the indication of the selection of the first prediction algorithm or the second prediction algorithm for the portion of the coding unit.

19. A method of graphics processing, comprising:

obtaining an indication of source data associated with a plurality of source components, wherein the plurality of source components includes a first source component and a second source component;

coding the first source component based on a first prediction algorithm and the second source component based on the first prediction algorithm and a second prediction algorithm;

determining a first rate of the first prediction algorithm and a second rate of the second prediction algorithm based on the coding of the first source component and the second source component; and selecting the first prediction algorithm or the second prediction algorithm for a portion of a coding unit based on the first rate of the first prediction algorithm and the second rate of the second prediction algorithm.

20. A computer-readable medium storing computer executable code for graphics processing, the code when executed by a processor causes the processor to:

obtain an indication of source data associated with a plurality of source components, wherein the plurality of source components includes a first source component and a second source component;

code the first source component based on a first prediction algorithm and the second source component based on the first prediction algorithm and a second prediction algorithm;

determine a first rate of the first prediction algorithm and a second rate of the second prediction algorithm based on the coding of the first source component and the second source component; and select the first prediction algorithm or the second prediction algorithm for a portion of a coding unit based on the first rate of the first prediction algorithm and the second rate of the second prediction algorithm.

* * * * *